US010579718B2

(12) United States Patent
Page

(10) Patent No.: US 10,579,718 B2
(45) Date of Patent: Mar. 3, 2020

(54) SYSTEM AND METHOD FOR INTERACTING IN LAYERS IN CHANNELS OVER THE DISPLAY OF A RESOURCE BY ANOTHER APPLICATION

(71) Applicant: John Henry Page, Washington, DC (US)

(72) Inventor: John Henry Page, Washington, DC (US)

( * ) Notice: Subject to any disclaimer, the term of this patent is extended or adjusted under 35 U.S.C. 154(b) by 240 days.

(21) Appl. No.: 15/389,896

(22) Filed: Dec. 23, 2016

(65) Prior Publication Data

US 2017/0109338 A1  Apr. 20, 2017

Related U.S. Application Data

(63) Continuation-in-part of application No. 15/215,140, filed on Jul. 20, 2016, and a continuation-in-part of (Continued)

(51) Int. Cl.
*G06F 17/30* (2006.01)
*G06F 17/24* (2006.01)
(Continued)

(52) U.S. Cl.
CPC .......... *G06F 17/241* (2013.01); *G06F 3/0488* (2013.01); *G06F 3/04817* (2013.01);
(Continued)

(58) Field of Classification Search
CPC .......... G06F 17/241; G06F 9/451; G06F 3/14; G06F 17/30991; G06F 3/04817; G06F 17/30876; G06F 3/0488; G06F 3/048; G06F 3/0484; G06F 3/04842; G06F 3/0481; G06F 3/0482; G06F 3/04883; G06F 16/9535; G06F 16/954; G06F 16/9566; G06F 17/2247; G06F 3/0486; G06F 16/9577; G06F 16/958; G06F 2203/04802; G06F 3/04815; G06F 3/0483; G06F 9/44526; G06F 16/00; G06F 16/248; G06F 16/26; G06F 16/34; G06F 16/93; G06F 16/951; G06F 16/957; G06F 17/276; G06F 21/60; G06F 21/6218; G06F 2201/815; G06F 3/017; G06F 3/04847; G06F 9/452; G06F 9/5077; G06F 11/0712; G06F 11/0778; G06F 11/3006; G06F 11/3072; G06F 11/321; G06F 11/324; G06F 11/3404; G06F 11/3409; G06F 11/3452; G06F 11/3476; G06F 11/3656; G06F 15/16; G06F 16/162; G06F 16/2457; G06F 16/24575; G06F 16/2477; G06F 16/25; G06F 16/285; G06F 16/287; G06F 16/30; G06F 16/332;
(Continued)

(56) References Cited

U.S. PATENT DOCUMENTS 5,271,097 A  12/1993  Barker et al.
5,874,959 A  2/1999  Rowe
(Continued)

*Primary Examiner* — Sheree N Brown

(57) ABSTRACT

Methods, apparatus and software allowing users to exchange and display information regarding the resources each of them is viewing. This information, which may comprise one or more of chat threads, stickers and drawings, is displayed at user display locations in an overlay to underlying electronic information resources.

11 Claims, 25 Drawing Sheets

Related U.S. Application Data application No. 13/938,122, filed on Jul. 9, 2013, now Pat. No. 9,674,260.

(51) Int. Cl.
| | | |
|---|---|---|
| *G06F 3/0488* | (2013.01) | |
| *G06F 3/0481* | (2013.01) | |
| *G09G 5/377* | (2006.01) | |
| *G06F 16/955* | (2019.01) | |
| *G06F 3/14* | (2006.01) | |
| *G06F 9/451* | (2018.01) | |
| *G06F 16/9038* | (2019.01) | |
| *G06Q 30/02* | (2012.01) | |

(52) U.S. Cl.
CPC ............... *G06F 3/14* (2013.01); *G06F 9/451* (2018.02); *G06F 16/9038* (2019.01); *G06F 16/955* (2019.01); *G06Q 30/02* (2013.01); *G09G 5/377* (2013.01); *G09G 2320/0693* (2013.01); *G09G 2340/12* (2013.01); *G09G 2370/022* (2013.01); *G09G 2370/027* (2013.01)

(58) Field of Classification Search
CPC .. G06F 16/3331; G06F 16/334; G06F 16/338; G06F 16/44; G06F 16/50; G06F 16/9014; G06F 16/9027; G06F 16/903; G06F 16/908; G06F 16/95; G06F 16/9532; G06F 16/9537; G06F 16/955; G06F 16/9554; G06F 16/9574; G06F 16/986; G06F 17/18; G06F 17/218; G06F 17/2235; G06F 17/24; G06F 17/243; G06F 17/27; G06F 17/277; G06F 17/278; G06F 17/2795; G06F 17/40; G06F 19/325; G06F 19/326; G06F 19/3418; G06F 19/3475; G06F 19/3481; G06F 1/1626; G06F 1/1694; G06F 21/00; G06F 21/10; G06F 21/51; G06F 21/55; G06F 21/6227; G06F 21/6245; G06F 21/6263; G06F 21/82; G06F 21/83; G06F 21/84; G06F 21/85; G06F 2200/1637; G06F 2201/86; G06F 2201/865; G06F 2216/07; G06F 2221/2123; G06F 2221/2127; G06F 3/012; G06F 3/013; G06F 3/018; G06F 3/0236; G06F 3/0237; G06F 3/0346; G06F 3/039; G06F 3/043; G06F 3/0433; G06F 3/0487; G06F 3/04886; G06F 3/1204; G06F 3/1226; G06F 3/1236; G06F 3/1292; G06F 3/1415; G06F 3/1423; G06F 3/1454; G06F 8/38; G06F 8/60; G06F 9/44; G06F 9/4411; G06F 9/453; G06F 9/45533; G06F 9/45558; G06F 9/5011; G06F 9/5072; G06F 9/54; G06Q 30/00; G09G 5/377; G09G 2320/0693; G09G 2340/12; G09G 2370/022; G09G 2370/027
USPC ........................................................ 715/738
See application file for complete search history.

(56) References Cited

U.S. PATENT DOCUMENTS

| | | |
|---|---|---|
| 6,584,479 B2 | 6/2003 | Chang et al. |
| 7,209,928 B2 | 4/2007 | Kenyon |
| 8,122,014 B2 | 2/2012 | Brindley et al. |
| 2003/0187968 A1 | 10/2003 | McKnight |
| 2011/0258526 A1* | 10/2011 | Supakkul .............. G06F 16/958 715/230 |

* cited by examiner

SYSTEM AND METHOD FOR INTERACTING IN LAYERS IN CHANNELS OVER THE DISPLAY OF A RESOURCE BY ANOTHER APPLICATION

A portion of the disclosure of this patent document contains material which is subject to (copyright or mask work) protection. The (copyright or mask work) owner has no objection to the facsimile reproduction by anyone of the patent document or the patent disclosure, as it appears in the patent and trademark office patent file or records, but otherwise reserves all (copyright or mask work) rights whatsoever.

FIELD OF THE INVENTION

The invention relates generally to graphical user interfaces enabling users to automate processing of and action over electronic information resources generated by underlying software applications and graphically showing the results in a visual overlay.

BACKGROUND OF THE INVENTION

Users employ software applications to search for, view information resources. These individual software applications have varying capabilities for automating user actions to finding, filtering, analyzing and updating the information resources.

Without automated support for processing results displayed by the underlying software application, achieving desired objectives can be very time consuming and mentally taxing for users, for example requiring them to copy reference identifiers, mentally memorize and compare displayed results to satisfy a set of conditions they hold in their mind. Furthermore, when undertaking numerous and/or complex tasks users experience cognitive stress which can be relieved by having a system that a) enables them to organize activities and tasks within distinct channels and b) remembers for them the display location context of marks that they place over that information. The benefits of these capabilities include that, rather than having to bookmark web pages, take screenshots, or maintain a separate document with links and comments, these activities are captured as part of the task process with no special user effort.

Furthermore, users need automated support regardless of the type of computing device or several devices that they may be using, where each may have different screen sizes and orientations.

BRIEF SUMMARY OF THE INVENTION

According to an embodiment of the present invention, a single user's activities, which may be one or more of:
examining a plurality of electronic information resources;
attaching a chat thread to a viewing position within an electronic information resource;
placing a sticker at a viewing position within an electronic information resource;
attaching a user-generated drawing to a viewing position within an electronic information resource;
injecting user-generated content such as photo images as new electronic information resources;
or data resulting from such activities are automatically associated as annotations overlaid at their designated display location in a channel which may be determined by the user.

According to an embodiment of the present invention, a user may switch from one channel to another and send one or more annotations to a different channel from a currently active channel.

According to an embodiment of the present invention, a plurality of users may participate in a channel to create one or more annotations that are shared between them within said channel.

According to an embodiment of the present invention, channels may be established that give some users restricted access, such as view only permissions.

According to an embodiment of the present invention, the system provides access to the annotations for the purposes of creating analyses of individual user activities, group user activities, activities within a channel, activities across a group of channels, real-time trending information by activity type and electronic information resource or combinations thereof.

BRIEF DESCRIPTION OF THE SEVERAL VIEWS OF THE DRAWING

The foregoing features and advantages are illustrative only and will be more fully appreciated in view of the appended figures described below.

FIG. 1 illustrates a channel carousel and expanded channel thumbnail detail according to an embodiment of the invention.

DETAILED DESCRIPTION OF THE INVENTION

This is a continuation and priority is claimed back to U.S. patent application Ser. No. 13/938,122 SYSTEM AND METHOD FOR EXCHANGING AND DISPLAYING RESOURCE VIEWING POSITION AND RELATED INFORMATION filed Jul. 9, 2013, U.S. provisional patent application No. 62/196,856 SYSTEM AND METHOD FOR GENERATING INTERACTIVE LAYERS OVER THE DISPLAY OF A RESOURCE BY ANOTHER APPLICATION filed Jul. 24, 2015 and U.S. patent application Ser. No. 15/215,140 SYSTEM AND METHOD FOR GENERATING INTERACTIVE LAYERS OVER THE DISPLAY OF A RESOURCE BY ANOTHER APPLICATION filed Jul. 20, 2016 which are each hereby incorporated by reference in their entirety herein.

Figure 1:
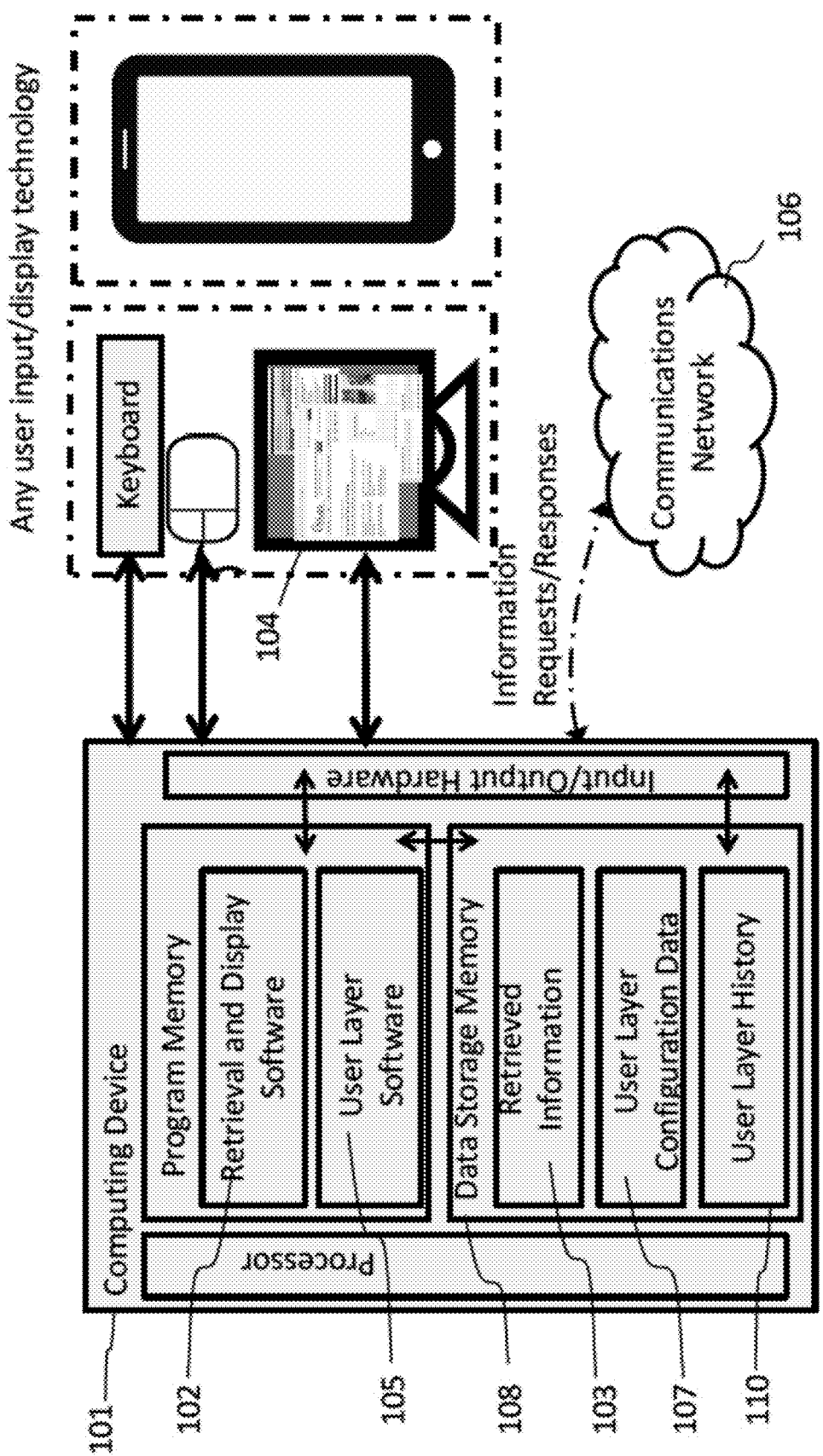
FIG. 1 shows user layer software installed on a user's computing device connected to a user display and a communications network according to an embodiment of the invention.

According to an embodiment of the present invention and as illustrated at FIG. 1, a user using a computing device 101 comprises a processor, program memory and data storage memory together with input/output hardware that connects the computing device to peripheral devices and a communications network 106. Peripheral devices to the computing device may comprise one or more of a user display 104, keyboard, pointing mechanism and other peripherals may include voice input, gesture recognition and motion detection devices. The user operates retrieval and display software 102 loaded onto the computing device 101 that initiates information requests and receives responses over a communications network 106 to display retrieved information 103 on the a user display 104. Under this embodiment, the user loads user layer software 105 to process retrieved information 108 according to the specifications contained in one or more sets of user layer configuration data 107 to generate one or more user layer displays 302.

Figure 2:
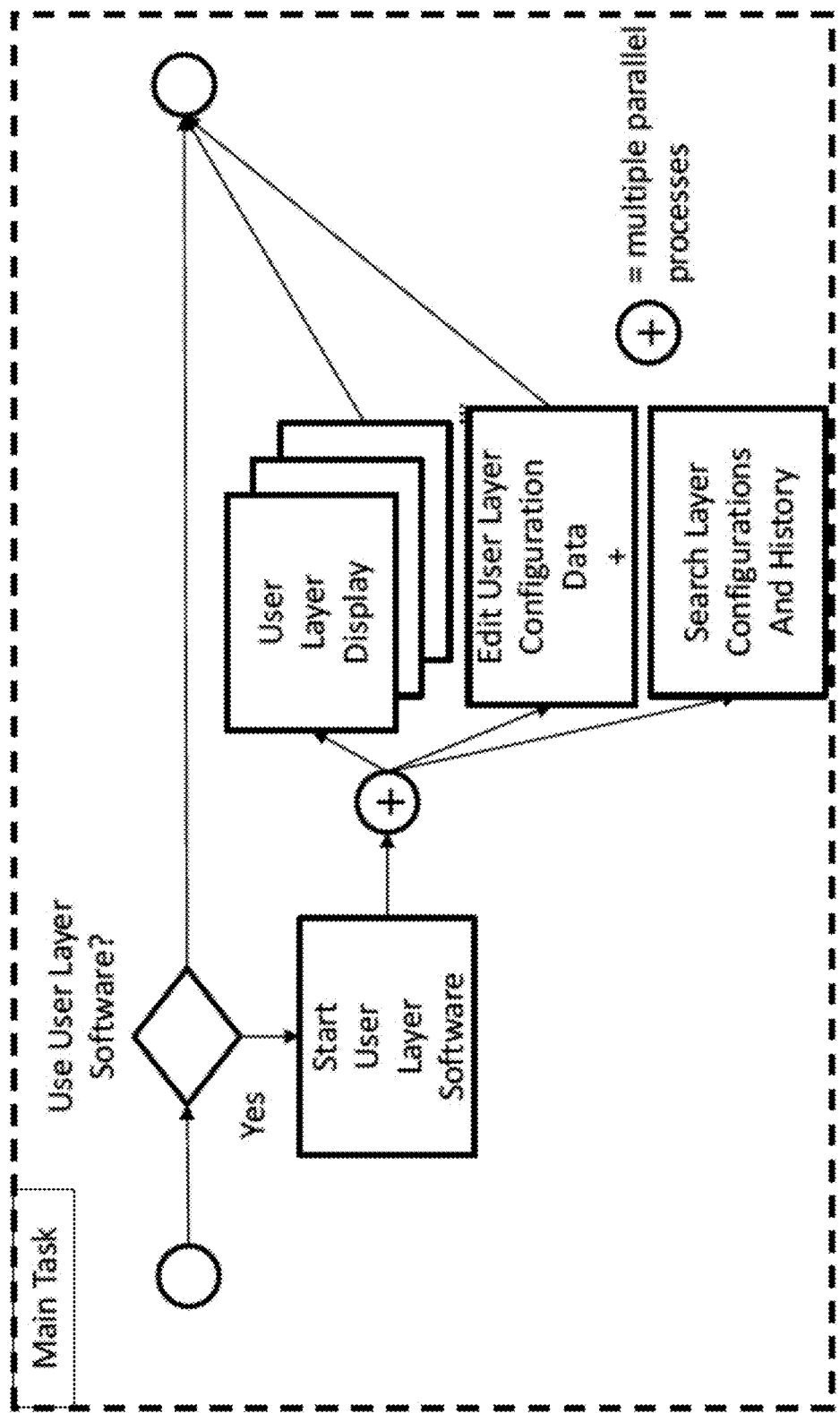
FIG. 2 is a high level view process flow of user layer software's operation from a user's perspective showing that after selecting to use user layer software they may edit user layer configuration data to produce user layer displays and search said layer configuration data and the history produced by its operation, according to an embodiment of the invention.

In a preferred embodiment, a user may control the behavior of the user layer software 105 through a main task interface for which a control flow chart is illustrated at FIG. 2. A user may decide whether or not to use user layer software 105 and if they do they may create and edit one or more sets of user layer configuration data 107 and control which of said sets of user layer configuration data are active for the generation of user layer displays 302.

Figure 7:
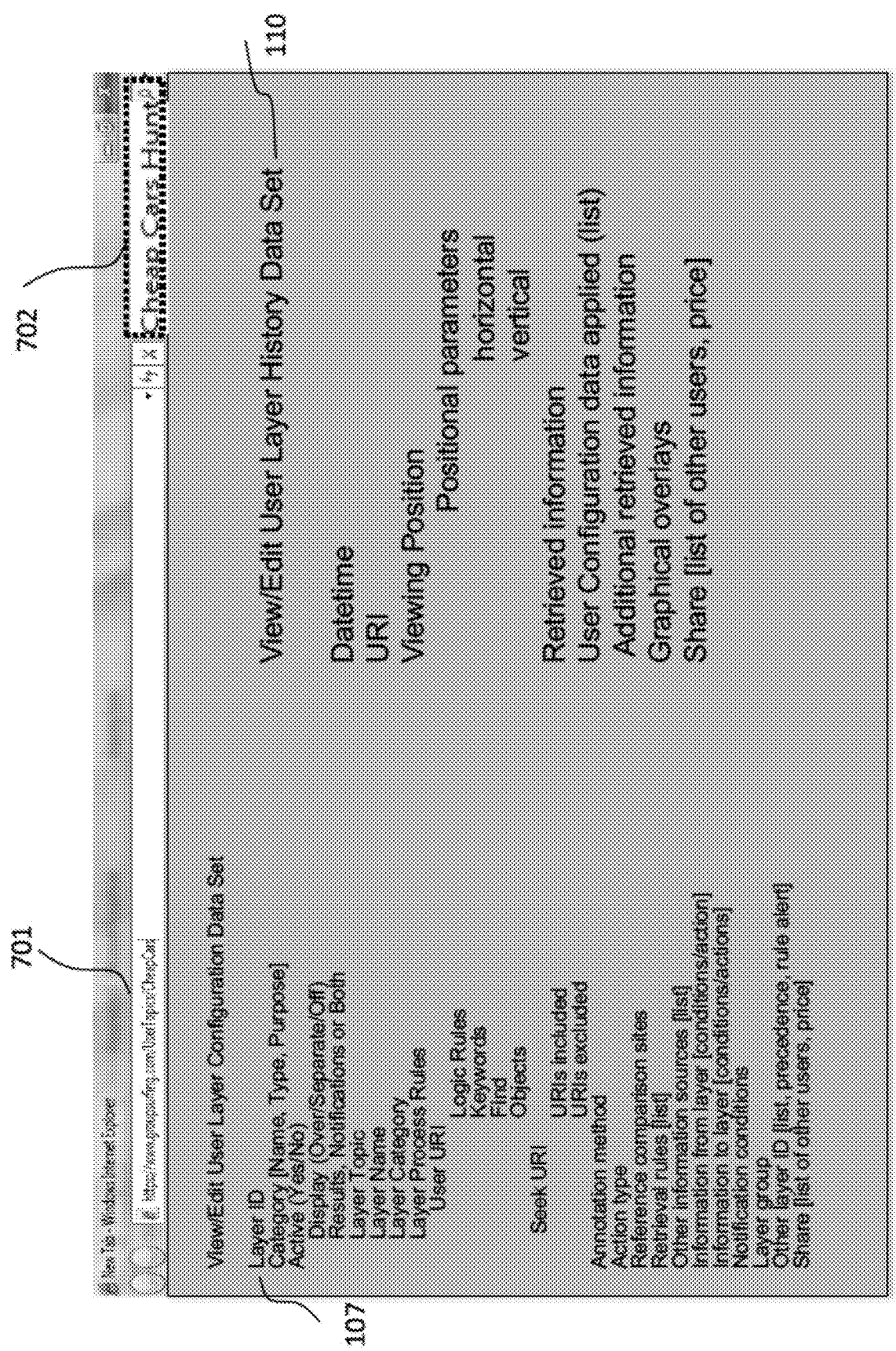
FIG. 7 illustrates user layer software being used to search and edit user layer configuration data and user layer history data, according to an embodiment of the invention.

In a preferred embodiment, each user layer's behavior, resulting from the application of user layer configuration data 107 to retrieved information 108 by user layer software 105, is configurable using parameters and instructions supplied by a user 501 that may comprise comparison tests against one or more of keywords, strings of words or phrases, logic sequences, language expressions, paradigms, object recognition and target outcomes as further illustrated at FIG. 7.

Figure 3:
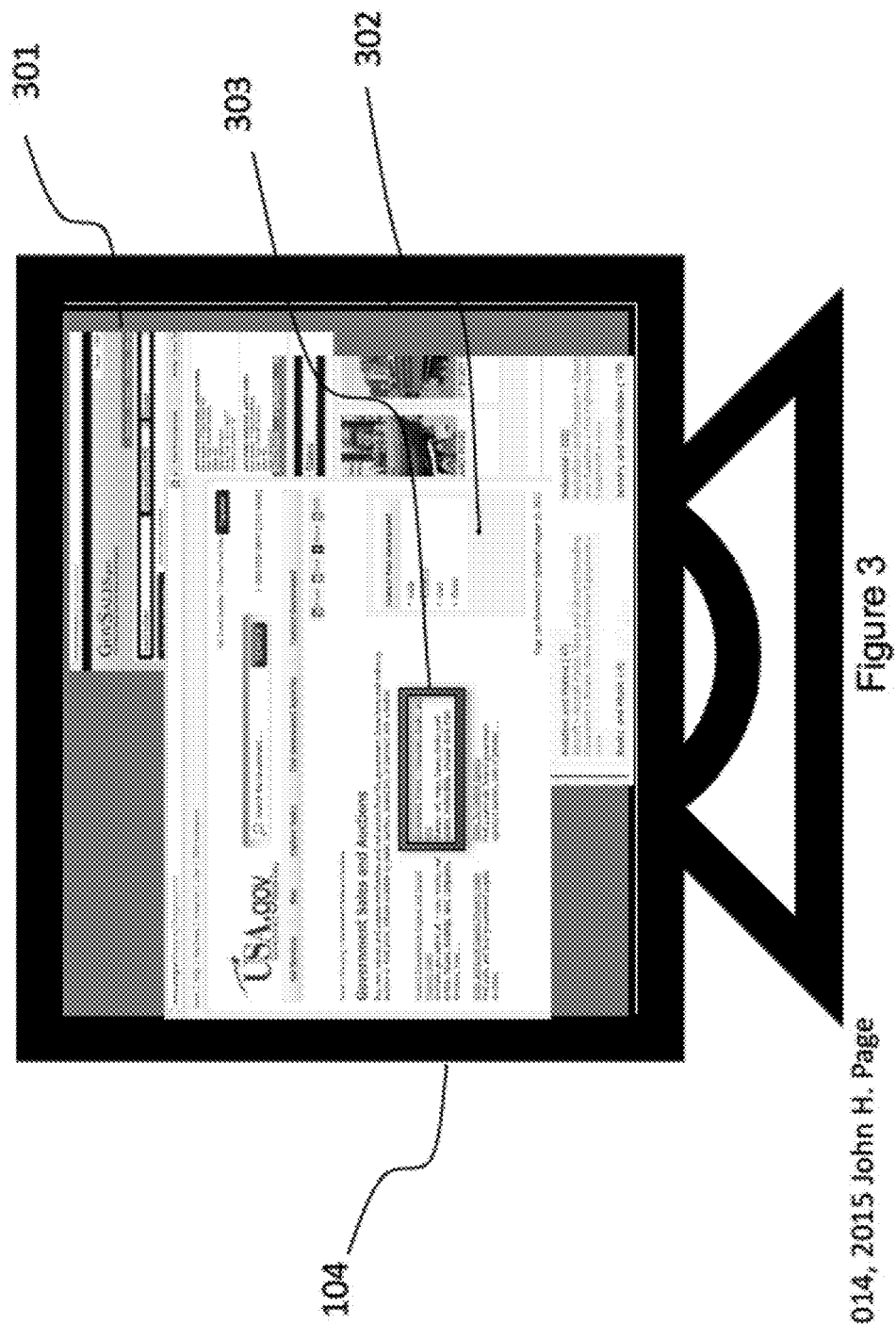
FIG. 3 shows the relationship between a user display and one or more display windows containing output from retrieval and display software and a user layer display produced by user layer software comprising one or more annotations of that output, according to an embodiment of the invention.

In the preferred embodiment user layer software 105 processes one or more sets of user layer configuration data 107 to compute one or more graphical overlays 303 for display in context with associated retrieved information 108 as rendered by retrieval and display software 102 on a user display 104 within a user display window 301 and this is illustrated in FIG. 3.

In another embodiment a graphical overlay 303 may be separately displayable, even to the extent of being shown in a separate user display window 301 than retrieved information 108. In combination, whether shown in the same window or not, rendered retrieved information 108 plus one or more graphical overlays 303 form a user layer display 302.

Figure 4:
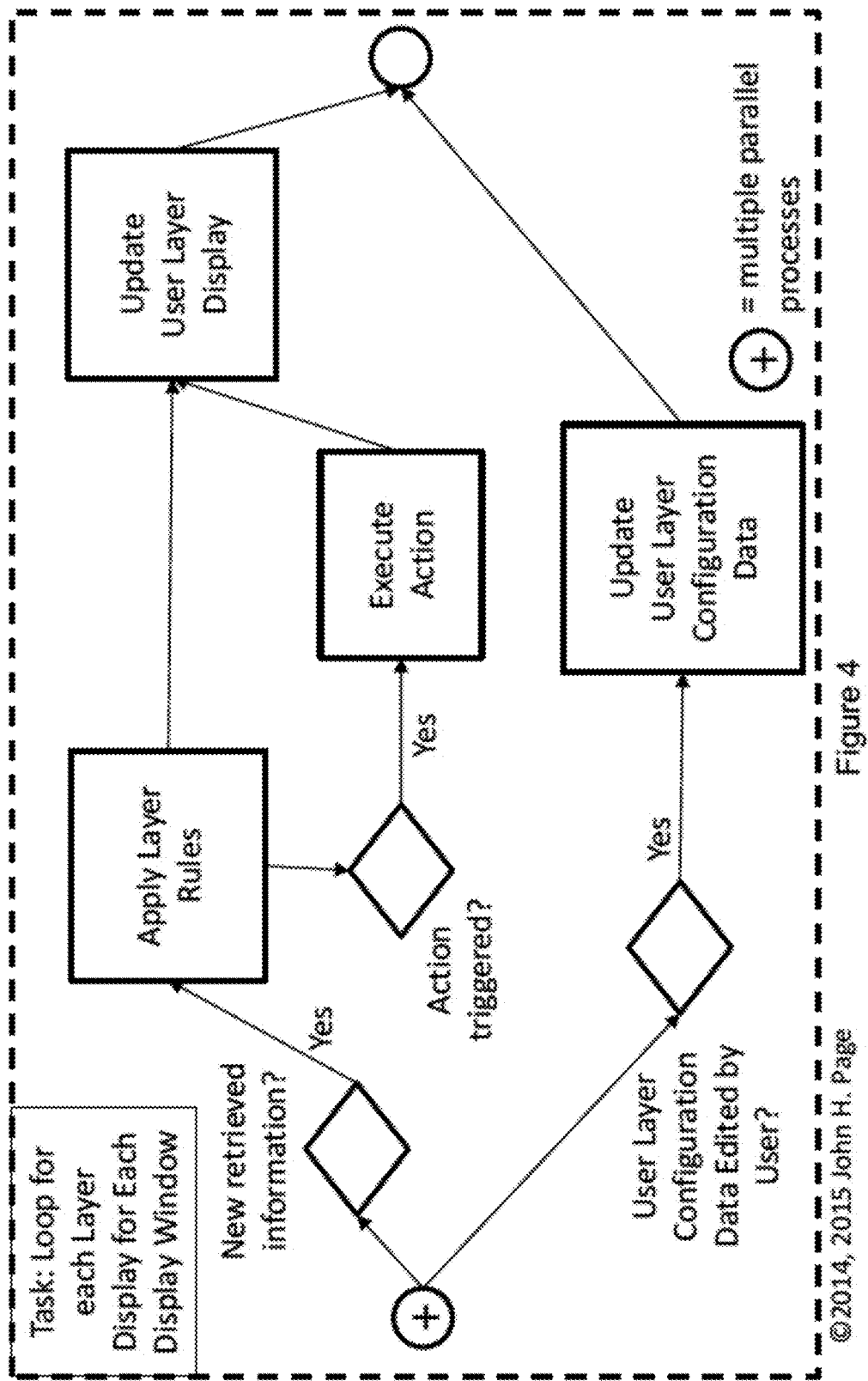
FIG. 4 illustrates a process flow of user layer software for one or more sets of user layer configuration data, which sets are applied to one or more display windows, according to an embodiment of the invention.

A preferred embodiment is illustrated in FIG. 4 which is a flow diagram of core functions performed by the user layer software 105 on an active set of user layer configuration data 107. Where user layer configuration data 107 contains parameters and instructions that require data in addition to retrieved information 103 the user layer software 105 executes actions to access that additional data which may reside in a user layer history 110 or, as in FIG. 5, on a storage device 503 attached to a resource server accessed via a communications network 106.

Figure 5:
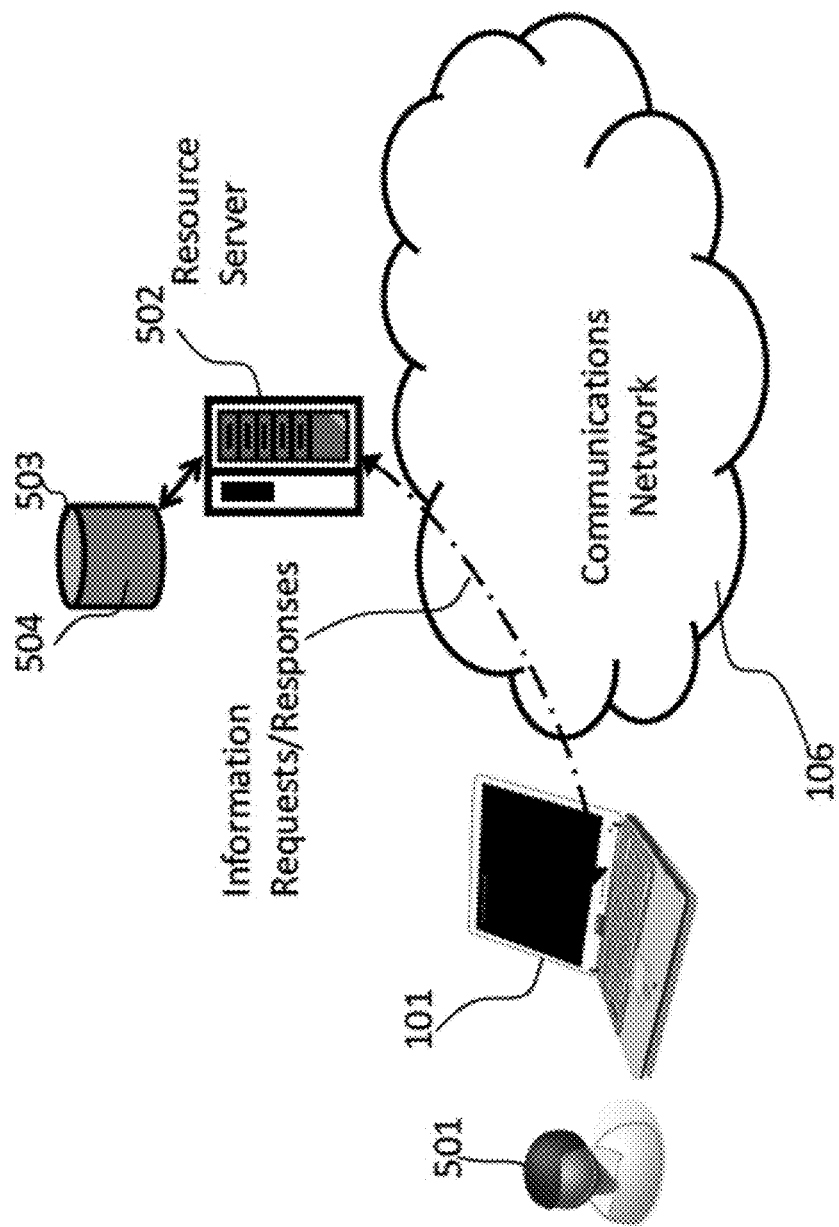
FIG. 5 shows the relationship between a user and a user computing device running user layer software and information resources retrieved from a resource server via a communications network, according to an embodiment of the invention.

FIG. 5 shows a preferred embodiment where a user's 501 computing device 101 is connected to a communications network 106 via which a user may cause the retrieval and display software 102 running on the device to make requests to information resource servers 502 which in turn accesses information storage devices 503 to access information resources 504 which are sent as a response to the computing device 101 over the communications network where they become retrieved information 108 for rendering by the retrieval and display software 102 on the user display 104 and for any processing by the user layer software 105.

Figure 6:
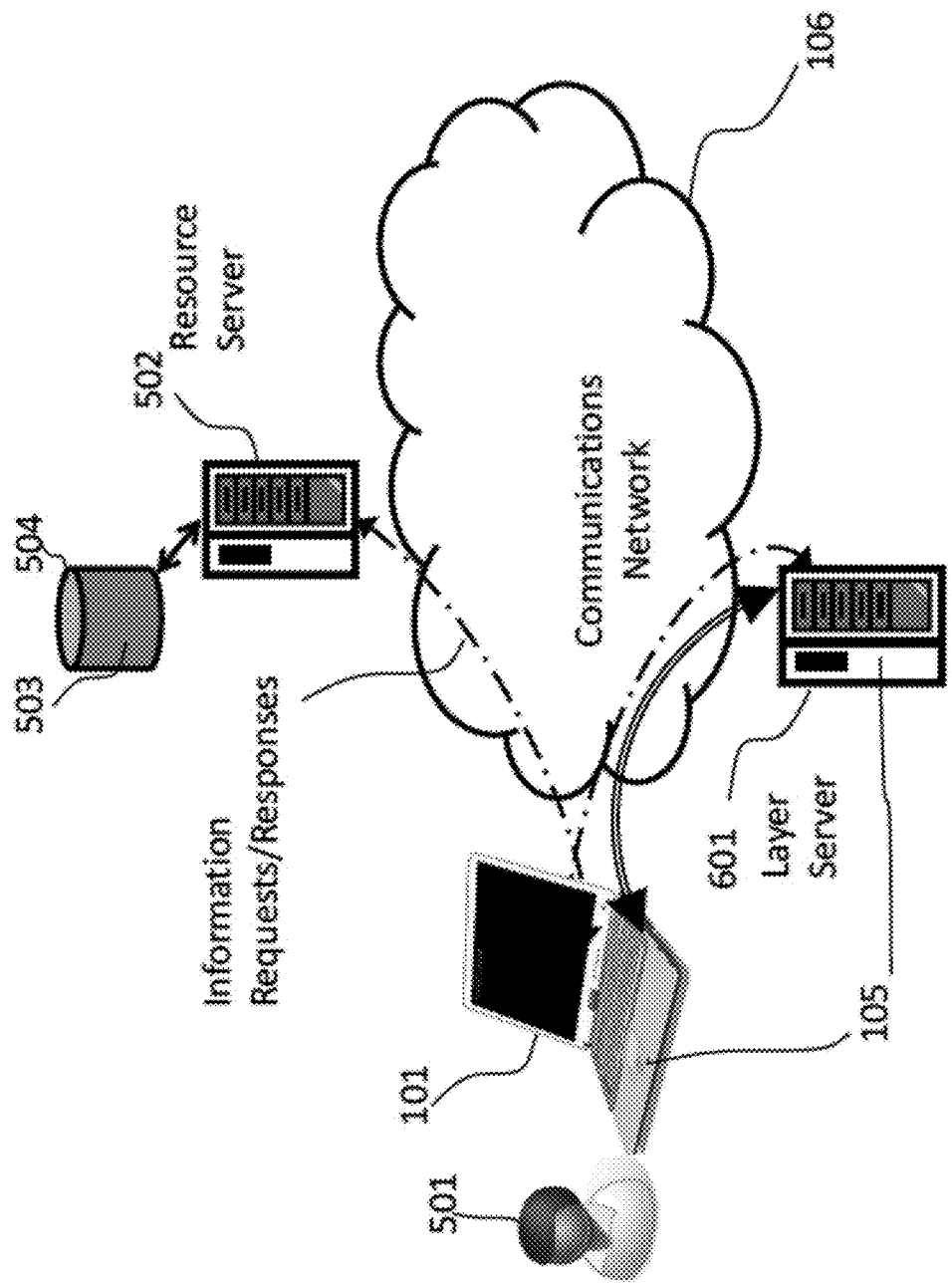
FIG. 6 is similar to FIG. 5 with the addition of a layer server attached to the communications network to store information related to user layers remotely from a user's computing device, according to an embodiment of the invention.

In the preferred embodiment, user layer configuration data 107 and user layer history 110 information may also be stored on a layer server 601 as illustrated in FIG. 6. A user 501 may thus access their user layer configuration data 107 and said histories thereof using any computing device 101 from which they are able to sign in to said layer server.

In a preferred embodiment as illustrated at FIG. 7, user layer software 105 provides a user 501 the ability to search and optionally edit one or more of user layer configuration data 107 and user layer history 110 data.

In a preferred embodiment, user layer software 105 allows for the naming of each set of user layer configuration data 107, illustrated in FIG. 7, for easy reference and for sets of user layer configuration data 107 to be grouped together to form a layer group and for each group to be named and activated together In the preferred embodiment, through layer precedence information stored within user layer configuration data 107 illustrated in FIG. 7, a user 501 may combine two or more sets of user layer configuration data 107 through cross-reference information that defines one or more connections between such sets of user layer configuration data 107 including the precedence of their processing and the condition activating said cross-reference; for example, one said set of user layer configuration data 107 may highlight duplicate items within the retrieved information 108, one said set may search for lowest price information for non-duplicate items by accessing additional retrieved information 108 and another said set may compare the results with prior results stored in the user layer history 110, all resulting a graphical overlay 303 annotating unique items with the current lowest price for each and prior lowest prices.

Figure 8:
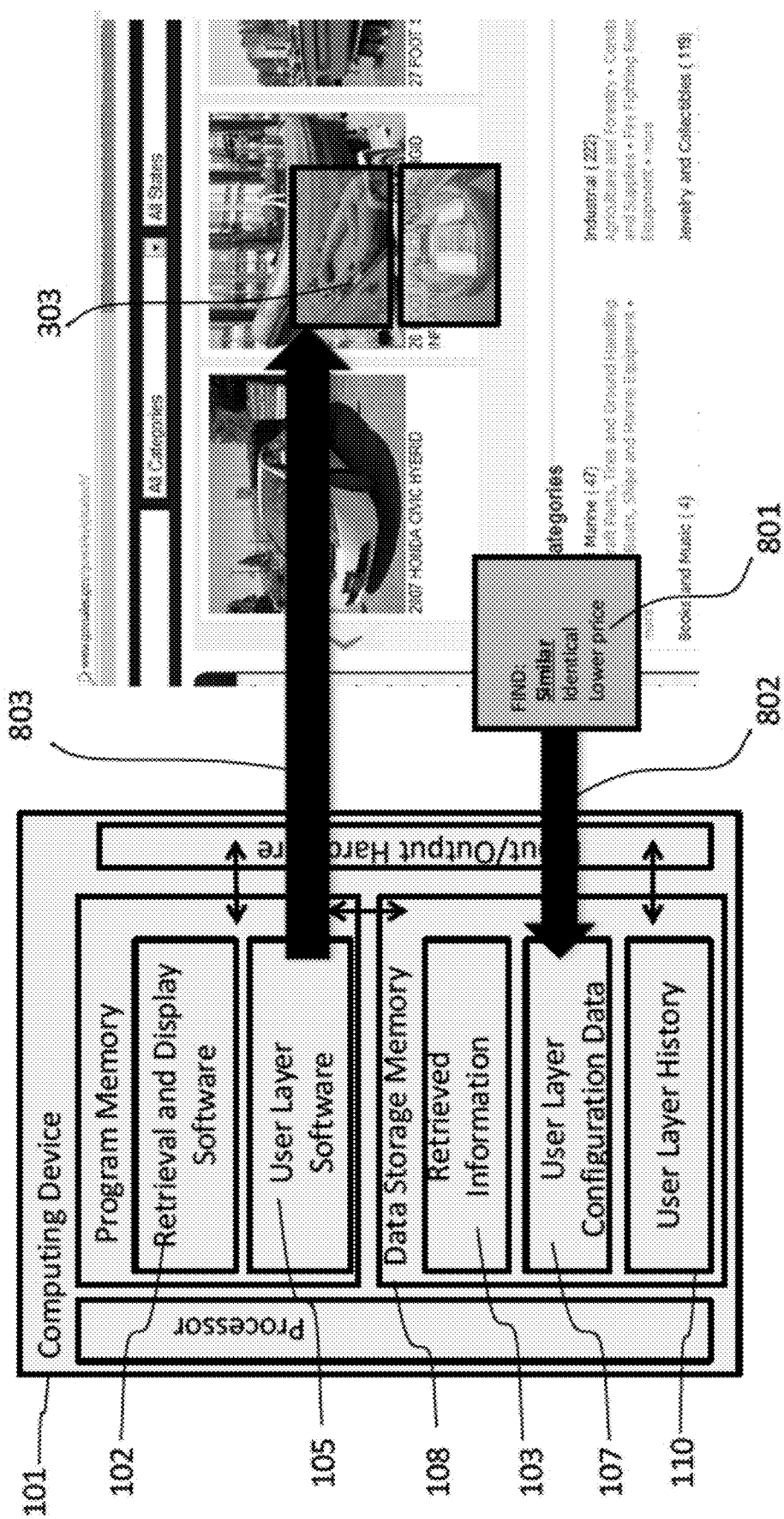
FIG. 8 is a schematic of the data flows in user layer configuration data being processed by user layer software to produce a graphic overlay, according to an embodiment of the invention.

In the preferred embodiment, a set of user layer configuration data 801 to be processed is loaded 802 into data storage memory 108 for user layer configuration data 107 in the user's computing device 101 where it is processed by user layer software 105 against retrieved information 103. A graphical overlay 303, if any results, is output 803 by user layer software 105 as part of a user layer display 302 in context with the rendered retrieved information 103. FIG. 8 provides a schematic representation of the above steps.

Figure 9:
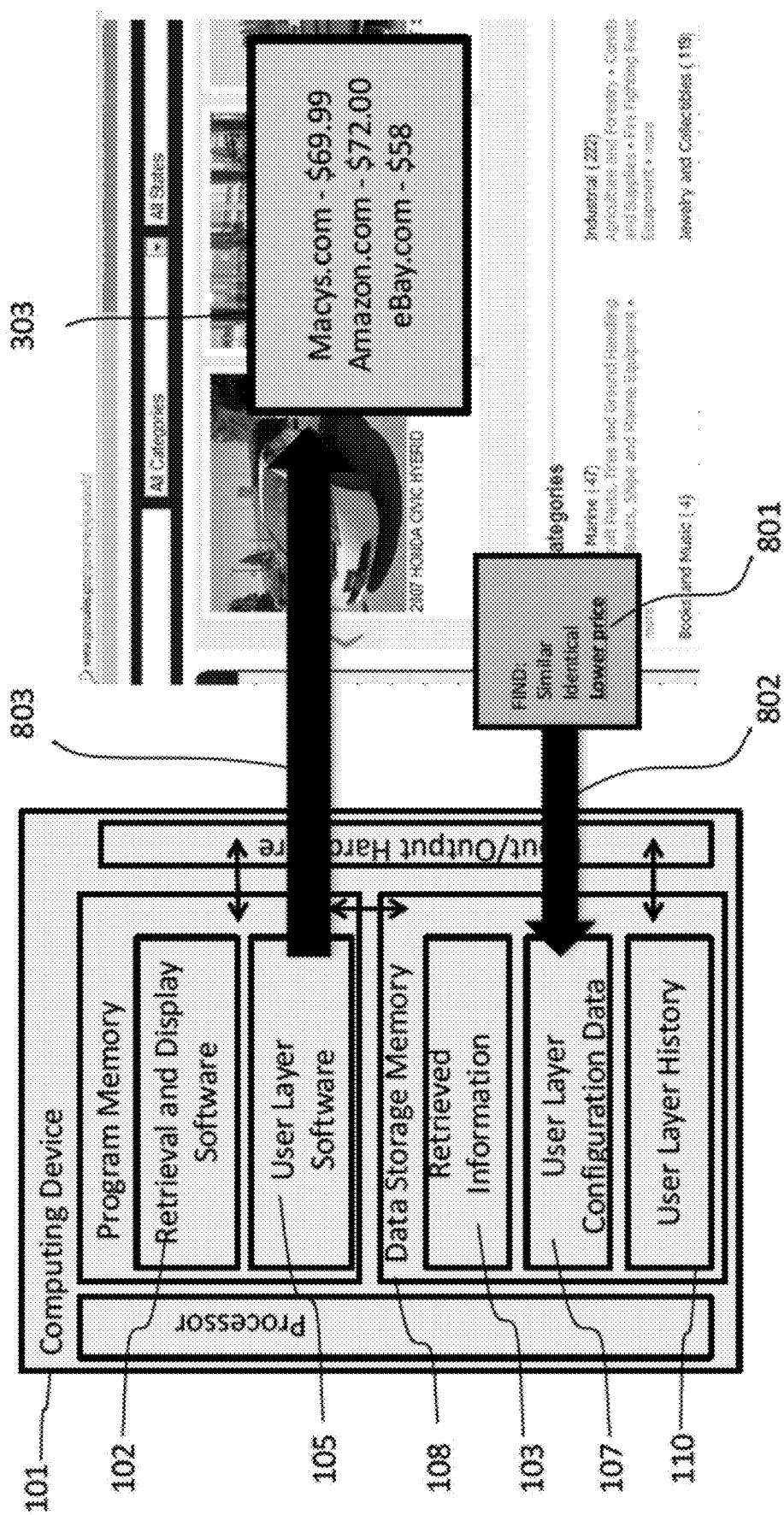
FIG. 9 exemplifies a result of processing a set of user layer configuration data that screens out items not meeting a criterion, according to an embodiment of the invention.

In the preferred embodiment, use layer software 105 stores a user layer history 110 that retains retrieved information 108 and results of its processing said retrieved information 108 according to user layer configuration data 107. An illustration of including user layer history 110 to produce a graphical overlay 303 is contained in FIG. 9, which is identical to FIG. 8 except that the user layer configuration data 107 has been edited to trigger a "Lower price" comparison rather than "Similar". For example, if a user is conducting a search of the Internet using retrieval and display software 102 and wishes to know which elements or group of elements in resulting retrieved information 108 were already returned by their prior searches, such conditions would be specified by the user as part of user layer configuration data 108 which user layer software 105 would process to detect such conditions and generate a graphical overlay 303 to assist the user in distinguishing new results from prior duplicates.

Figure 10:
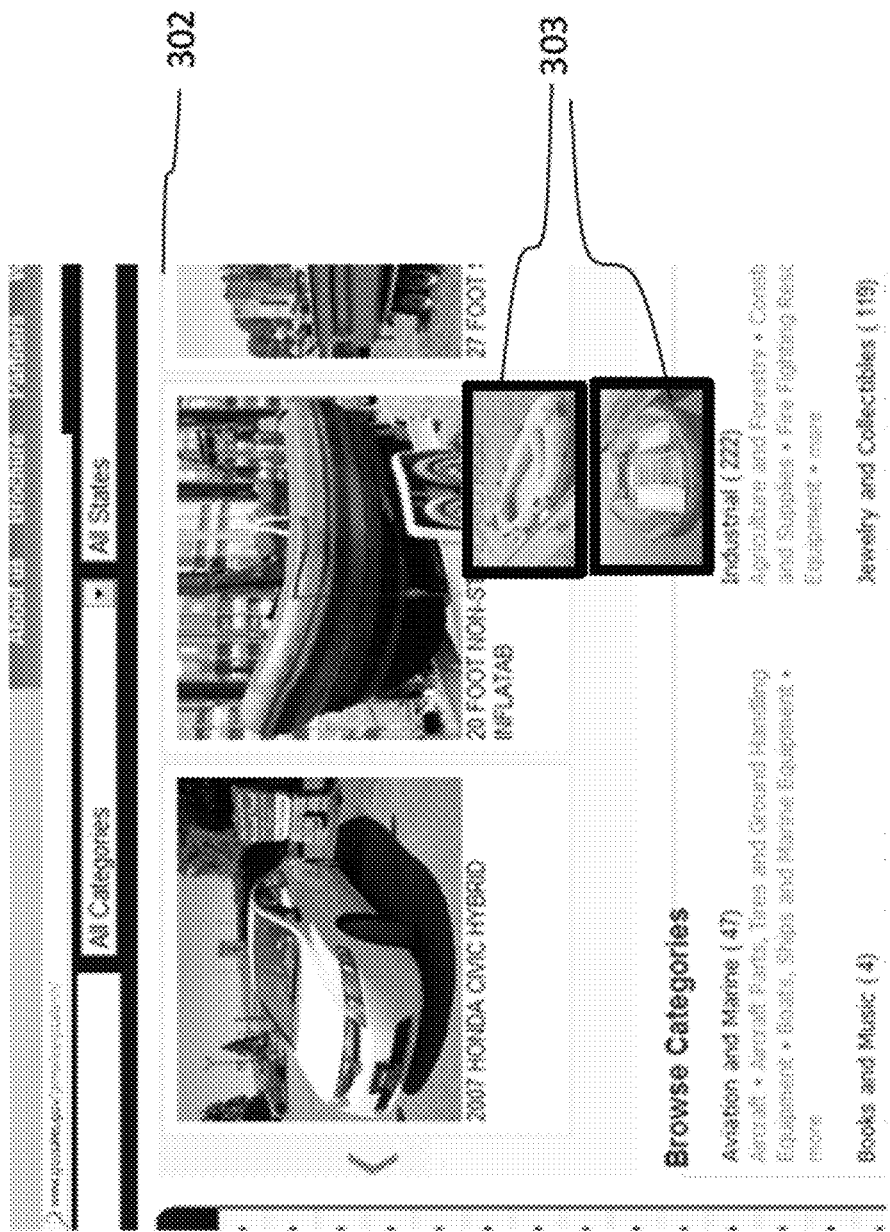
FIG. 10 illustrates examples of user layer display where the user layer software and user layer configuration data has resulted in notifications of objects also found on a set of reference sites defined in the user layer configuration data, according to an embodiment of the invention.

In a preferred embodiment, sets of user configuration layer data 107 are configurable by a user to automatically cause actions. For example, an automated process for finding matching data elements across a range of information resources 504 may be organized as follows: user layer configuration data 107 causes the user layer software 105 to first search a web page stored as retrieved information 108 for specific tagged elements by invoking the standard javascript function Element.getElementsByTagName( ) to return a list of all elements in said retrieved information 108 matching a tag name specified in user layer configuration data 107. Second, from the locations of other information resources 504 supplied as part if user layer configuration data 107, said user layer software 105 initiates retrieval and a search of said additional retrieved information 108 from said other information resources 504 to identify elements or groups of elements that match said tag name and generate a graphical overlay 303 highlighting elements for which matches were found and any ancillary information specified in the user layer configuration data 107 such as price and color. The result of such an operation is illustrated at FIG. 10, in which the screen shot shows a graphical overlay 303 annotating similar results from said other information resources 504 within a user layer display 302.

In the preferred embodiment, methods of annotation in graphical overlays 303 are specified in user layer configuration data 107 as illustrated at FIG. 7. By employing a variety of such methods, a user may define the color, style, positioning and other parameters of an annotation to distinguish between them and suit their preference either through public domain javascript methods such as window.alert ("annotation text"); to create a temporary pop-up window and rect(x, y, widthinpixels, heightinpixels); to draw a rectangle on top or proprietary or patented annotation methods. In this way, user configuration data 107 is used by user layer software 105 to display different distinguishing marks, style or modes of annotation in order to differentiate between results in a graphical overlay 303.

The preferred embodiment includes logic within the user layer software 105 to identify which subset of retrieved information 103 information has been visibly displayed within the display window 301 rendered by the retrieval and display software 102. The preferred embodiment accomplishes this by capturing a user's viewing position by means of positional parameters using one or more methods anticipated in claims 2 through 8 of patent application Ser. No. 13/938,122 filed Jul. 9, 2013 and storing said positional parameters as part of user layer history 110 data. User layer configuration data 107 may, therefore, additionally determine whether the user layer software 105 acts or acted on all retrieved information 108 or only retrieved information 108 that was visible to the user using viewing position information collected within user layer history data 110 as illustrated in FIG. 7.

Figure 11:
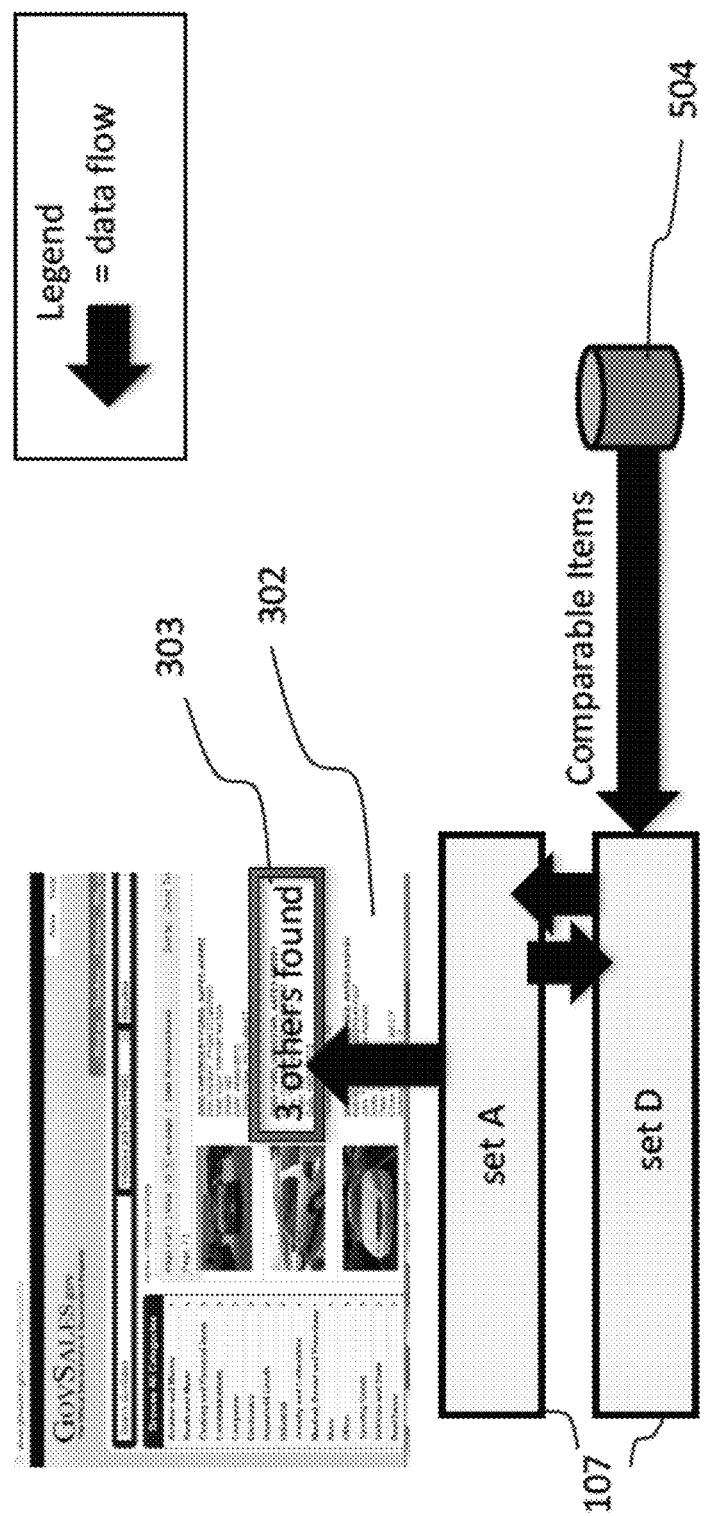
FIG. 11 illustrates an effect of configuring and combining two or more sets of user layer configuration data, according to an embodiment of the invention.
Figure 12:
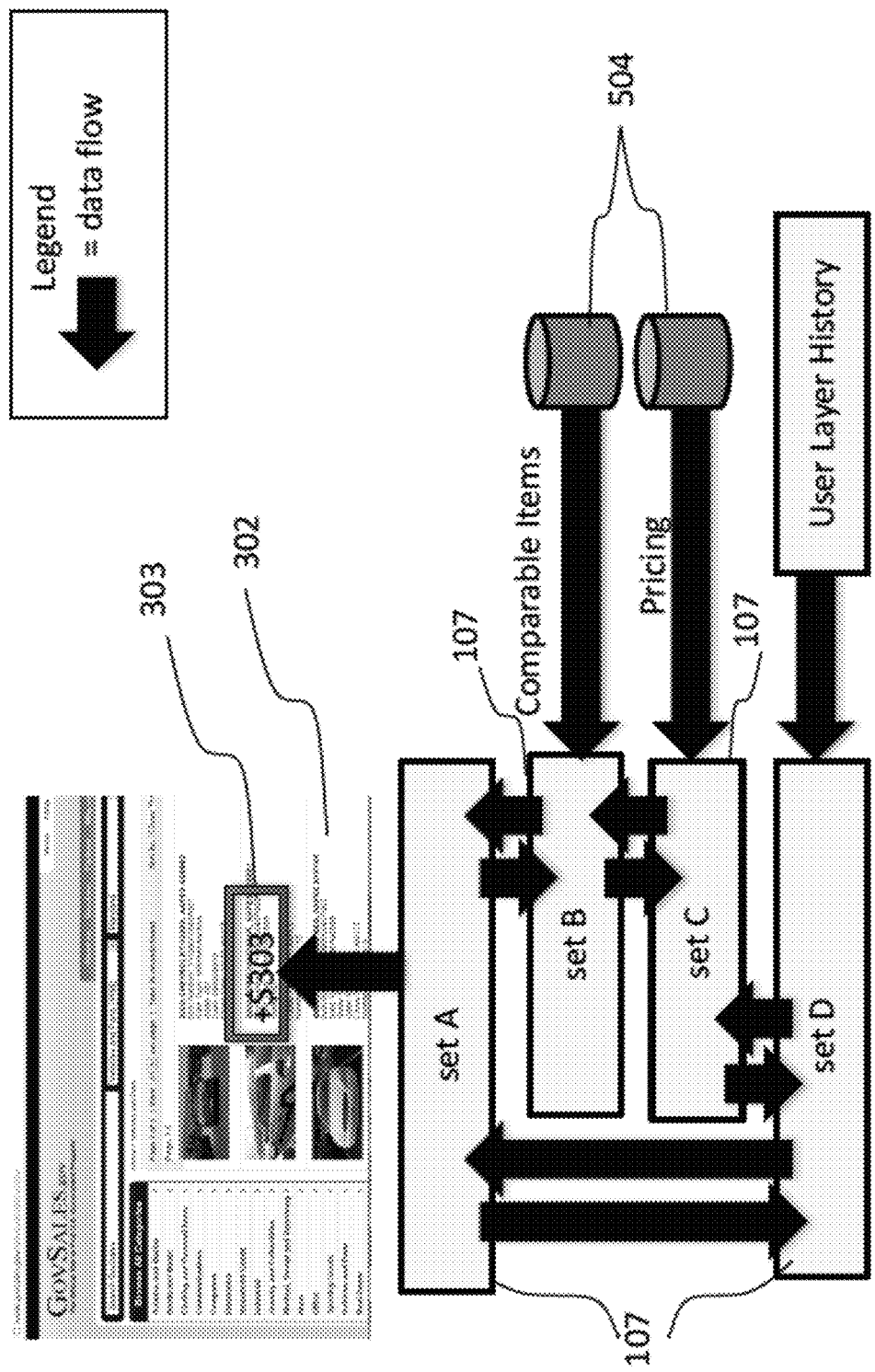
FIG. 12 is a schematic data flow diagram showing how multiple sets of user layer configuration data may interact with each other through the results from one layer being an input to one or more other layers.

The preferred embodiment of user layer software 105 may further assist the user 501 by allowing them to define how multiple sets of user layer configuration data 107 are applied to retrieved information 108. This embodiment allows a user 501 to specify, for example, sets of user layer configuration data 107 that should be applied on retrieved information 108 by user layer software 105 in series like successive filters, whether they are applied in parallel and whether iteration is applied. For example, by applying sets of user layer configuration data 107 in series user layer software 105 will produce a user display 104 annotating items that meet the conditions in all sets of user layer configuration data 107 whereas, by applying sets of user layer configuration data 107 in parallel, user layer software 105 will produce a user display 104 annotating items that meet the conditions defined within said sets of user layer configuration data 107 and when applying sets of user layer configuration data 107 iteratively, user layer software 105 will produce a user display 104 that is updated when underlying conditions change. This preferred embodiment of combining application of multiple sets of user configuration data 107 also solves for the user 501 problem of identifying similar but unique elements in a single graphical overlay 303 within a user layer display 302. A example of combining user layers to produce a graphical overlay 303 showing how many comparable items were found in a reference database is illustrated at the block diagram at FIG. 11 and an example block diagram of multiple user layers that together seek comparable items, seek pricing for them and displaying changes against historical results in a graphical overlay 303, is shown at FIG. 12.

Figure 13:
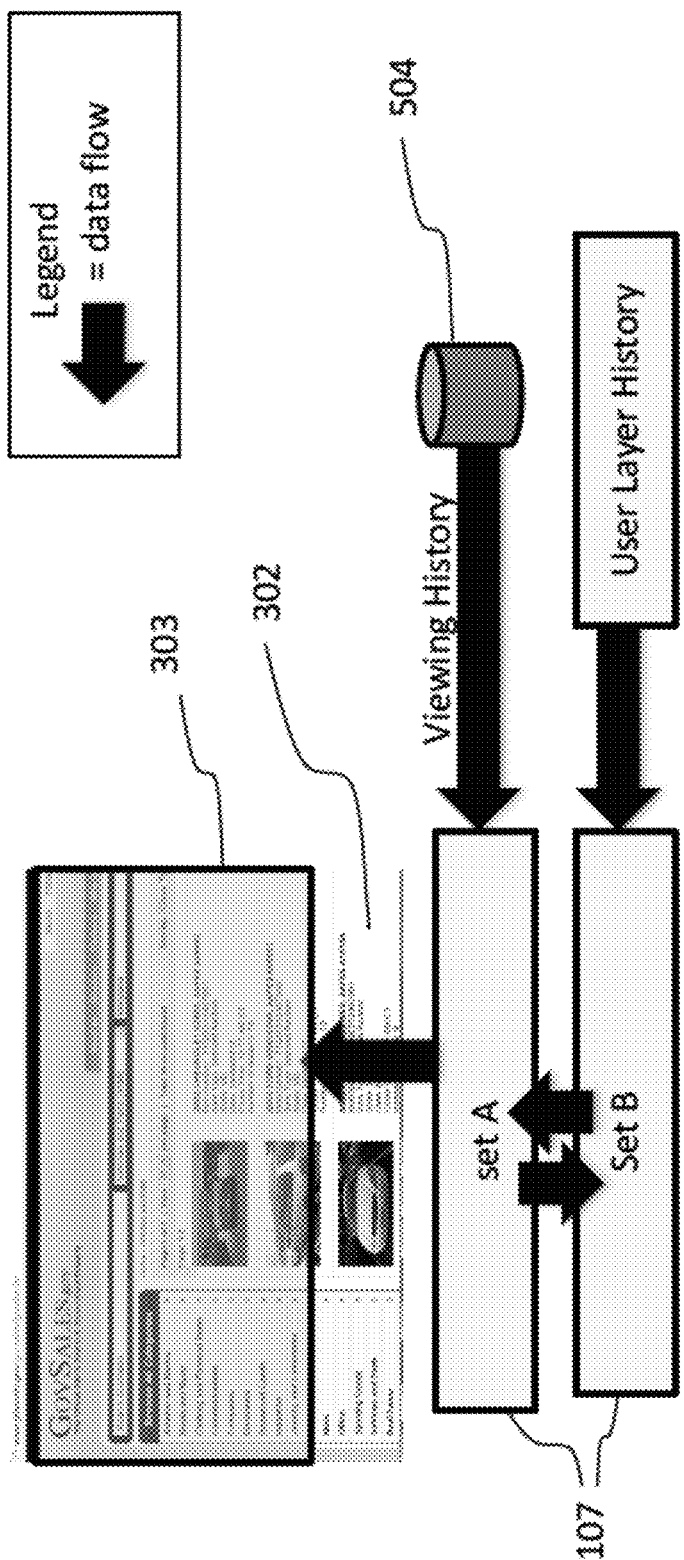
FIG. 13 illustrates the result of configuring the system to annotate resources that have previously been viewed in a user's display window.

In a preferred embodiment, user layer software has access to a user's viewing history as an information resource 504 and user layer history 101 from which is produced a graphical overlay 303 that annotates a portion or portions of previously retrieved information 108 already seen by the user in the manner exemplified in FIG. 13.

Figure 14:
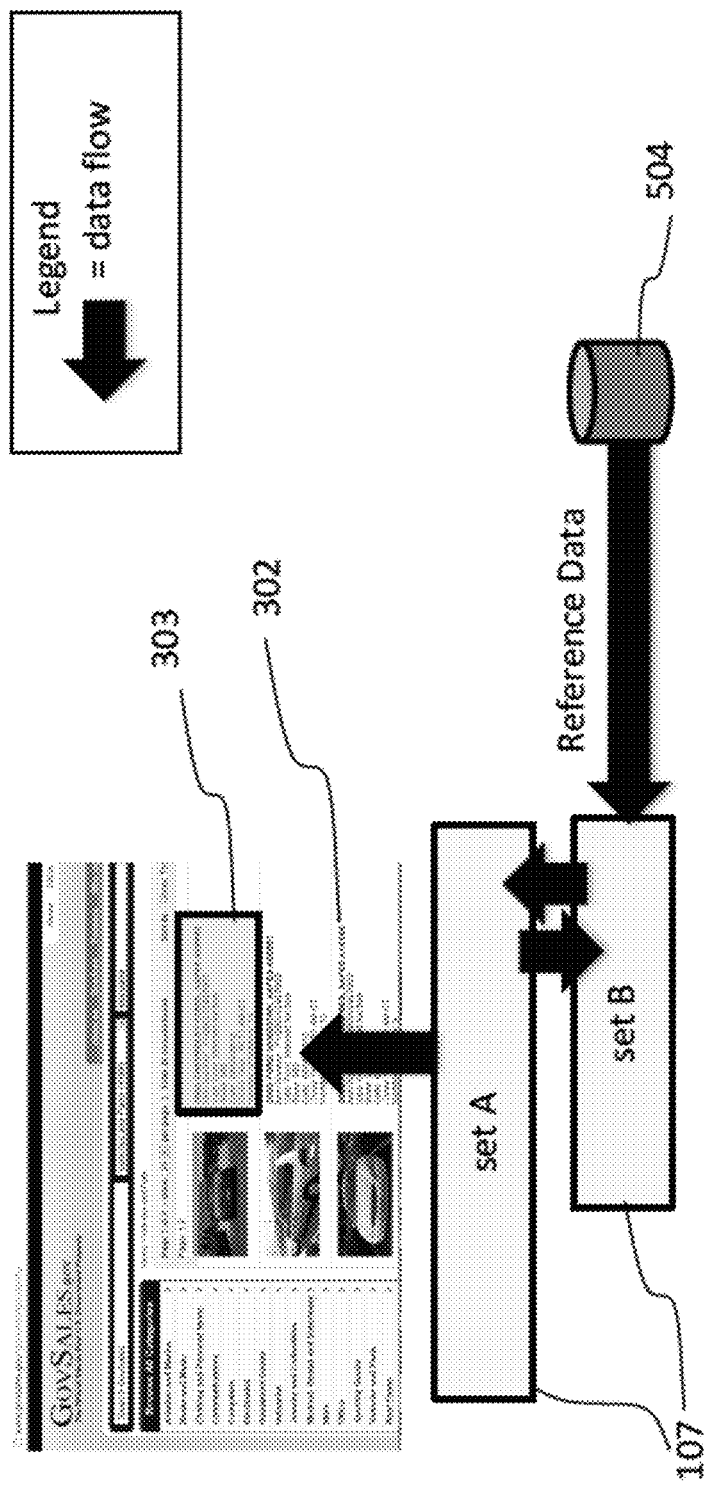
FIG. 14 illustrates the result of configuring the system to annotate text that appears in two sets of retrieved information.

In a preferred embodiment, user layer configuration data 107 is configurable by the a user to access one or more reference data sources as an information resource 504 such that elements within retrieved information 108 that also occur in said reference data are highlighted within a graphical overlay 303. Such a configuration is illustrated at FIG. 14.

In a preferred embodiment, user layer software 105 allows a user 501 to suppress a graphical overlay 303, thereby permitting them to see underlying rendered retrieved information 108 uncluttered by graphical overlay(s) 303.

The preferred embodiment of user layer software 105 assists users 501 in organizing their work by adding category meta-data, see example at FIG. 7, to user layer configuration data 107.

The preferred embodiment of user layer software 105 provides users 501 the ability to share at least one of user layer configuration data 107, graphical overlay 303, user layer display 302 and user layer history 110 with other users by stipulating so as illustrated in FIG. 7. Thus, an investment by one user in creating a user layer may be transferred for reuse to another user with the potential for monetary exchange in return for such transfer or reuse.

According to another embodiment of the invention, an apparatus for employing user layer software includes a display, an input/output hardware unit and a program memory coupled to a processor. Input/output hardware unit is capable of exchanging data with a network and data associated electronic resources accessible over a network. Program memory stores program instructions and a processor executes program instructions to (i) produce output from one or more software applications, (ii) execute user layer software for any user layer configuration data that has been enabled for those software applications, and (iii) display a graphical overlay derived from the output of user layer software placed in context with the output from said software applications in accordance with user layer configuration data.

According to another embodiment of the invention, a system for employing user layer software includes a database, an input/output hardware unit, and a program memory coupled to a processor. Input/output hardware unit is capable of exchanging data with a network. Program memory stores program instructions and the a processor is capable of executing program instructions to: (i) store and retrieve user layer configuration data from the database (ii) store and retrieve from the database results from the user layer software having been executed using user layer configuration data iii) initiate exchange with other users of user layer configuration data, iv) initiate exchange with another user of results from user layer software having been executed using their user layer configuration data.

According to another embodiment of the invention, a computer program product includes computer program logic stored in a tangible medium, wherein computer program logic executes program instructions to (i) execute user layer software for any user layer configuration data that has been enabled for a software application, and (iii) display a graphical overlay derived from the output of user layer software over the output from said software applications in accordance with user layer configuration data.

According to another embodiment of the invention, a computer program product includes computer program logic stored in a tangible medium, wherein computer program logic includes logic for causing a computer program to: (i) store and retrieve user layer configuration data from the database (ii) store and retrieve from the database the results from user layer software having been executed using user layer configuration data iii) initiate exchange with other users of user layer configuration data, iv) initiate exchange with another user of the results from user layer software having been executed using their user layer configuration data.

According to an embodiment of the present invention and as illustrated in the figures from which the present invention is a continuation, a user using a computing device comprises a processor, program memory and data storage memory together with input/output hardware that connects a computing device to peripheral devices and a communications network. Peripheral devices to the a computing device may comprise one or more of a user display, keyboard, pointing mechanism and other peripherals may include voice input, gesture recognition and motion detection devices. A user operates retrieval and display software loaded onto the a computing device that initiates information requests and receives responses over a communications network to display retrieved information on the a user display. Under this embodiment, a user 105 loads user layer software to process retrieved information in relation to the user's display location within the retrieved information to display overlay information.

Figure 15:
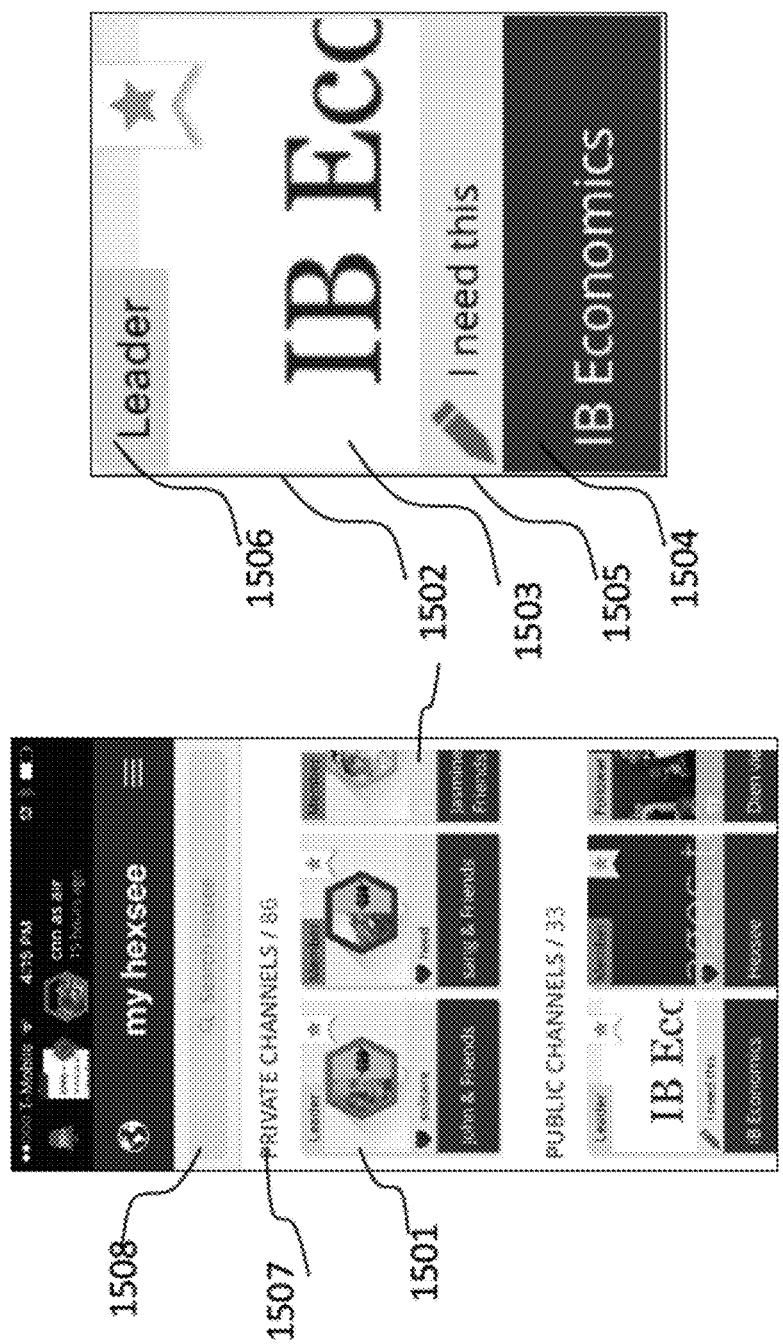
FIG. 15 illustrates a channel user interface components according to an embodiment of the invention.

In a preferred embodiment, a user 501 may organize their electronic information resource 1604 viewing activities into channels 1501 or expeditions as illustrated in FIG. 15, each of which is represented by a channel thumbnail 1502 comprising one or more of a channel image 1503, a channel name 1504, last channel activity information 1505 and channel user role information 1506. In a preferred embodiment, channels thumbnails 1502 may be in channel categories 1507 and may be searched through a channel search box 1508 to allow for the case, for example, of finding all channels with a particular user as a member.

Figure 16:
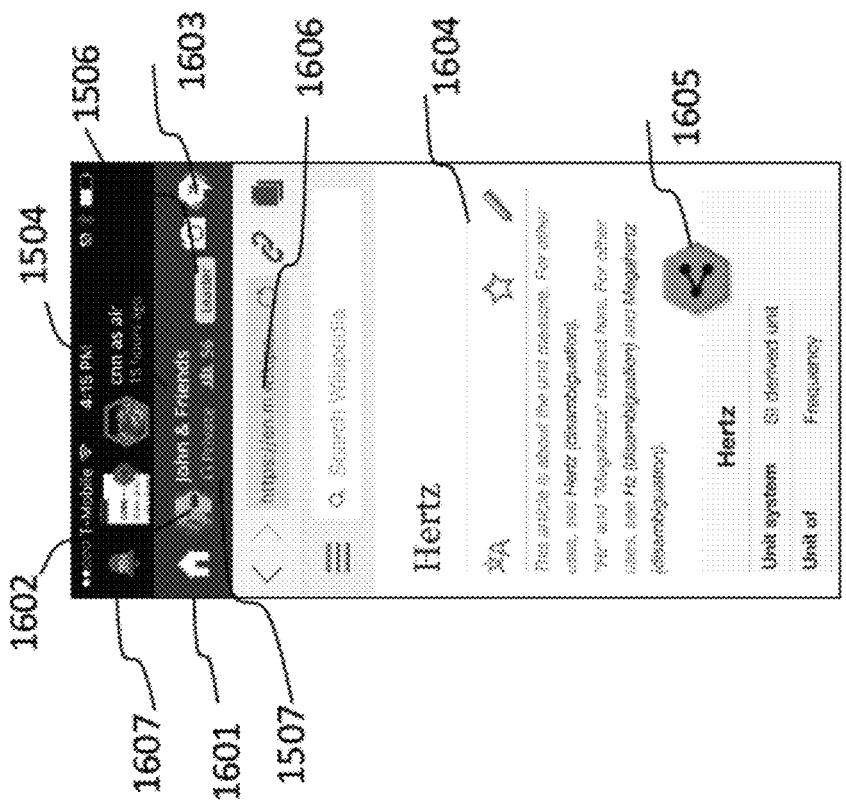
FIG. 16 illustrates an Internet browser display view with the channel header above the browser

In a preferred embodiment, once a user 501 has entered a channel they will be presented a channel screen as illustrated at FIG. 16 comprising one or more of:
  a channel header 1601 containing one or more of a
    channel name 1504, channel user role information
    1506, channel category 1507, channel member information 1602 which allows access to details of members
    of the a channel in the case there is a plurality of users
    with access to the a channel, a channel activity indicator 1603 which allows access to the activity in the a
    channel which may be spread over more than one
    electronic information resource and in some embodiments additional information including the number of
    users in a channel, the number of resources being viewed within a channel or expedition or other information related to activity in the a channel;

a resource display area 1604 showing an electronic information resource currently being viewed and optionally containing a sharing control element 1605 allowing a current user to select a specific display location for one or more of a new chat thread, sticker, drawing including a user generated drawing or insertion of other user generated content such as a photo image;

a resource browsing control area 1606 that permits a user to search for and select an electronic information resource to be showing in the a resource display area 1604;

an annotation notification area 1607 providing information about activities not always visible within a current electronic information resource display area 1604 for the a channel 1501 currently in focus.

Figure 17:
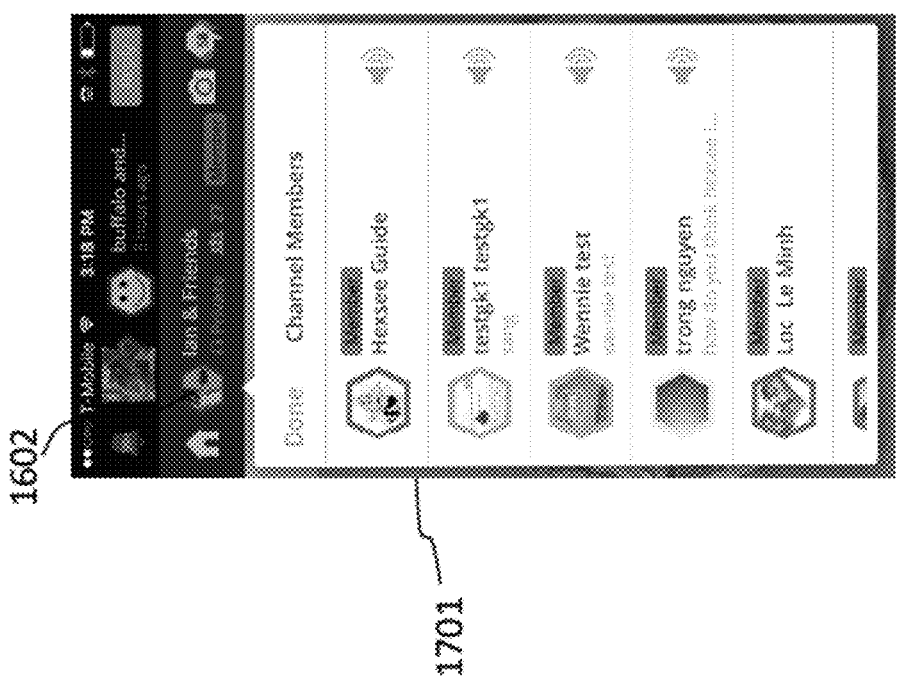
FIG. 17 illustrates a channel member detail according to an embodiment of the invention.

In a preferred embodiment illustrated at FIG. 17, activating channel member information 1602 which allows access to details of members of the a channel in the form of a channel member list 1701.

Figure 18:
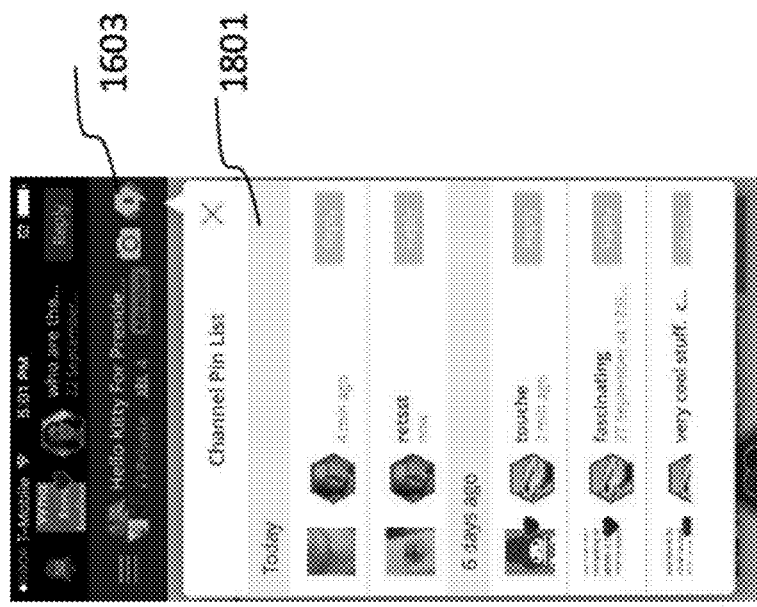
FIG. 18 illustrates a channel annotation list according to an embodiment of the invention.

In a preferred embodiment illustrated at FIG. 18, activating a channel activity indicator 1603 allows access to activity and any resulting annotations in the a channel which may be spread over more than one electronic information resource in the form of a channel activity list 1801.

Figure 19:
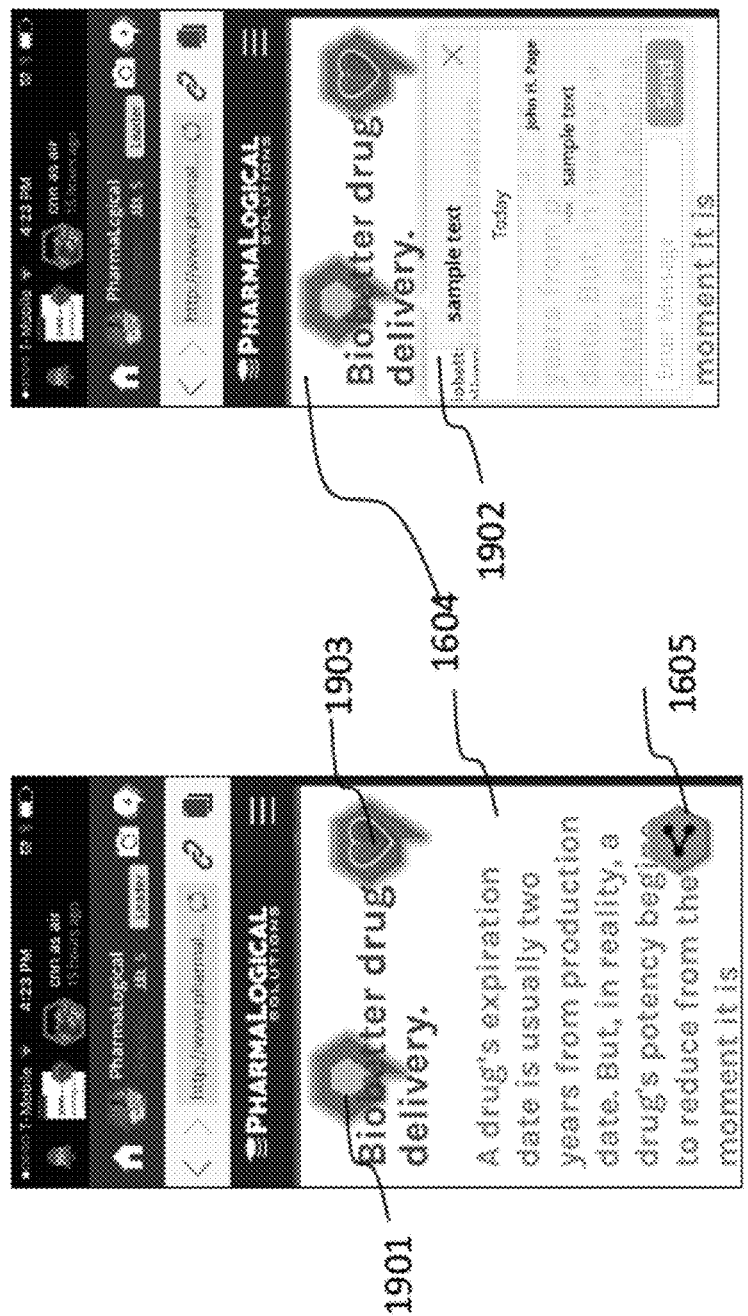
FIG. 19 illustrates chat and sticker annotations in overlays according to an embodiment of the invention.

In a preferred embodiment illustrated at FIG. 19, activating a sharing control element 1605 permits a user to create one or more of:

a chat thread attached to a display location which may be displayed in an overlay to a current electronic information resource 1604 as either a compact or closed chat thread indicator 1701 or an open chat thread 1702;

a sticker attached to a display location 1703 in an overlay to a current electronic information resource 1604.

Figure 20:
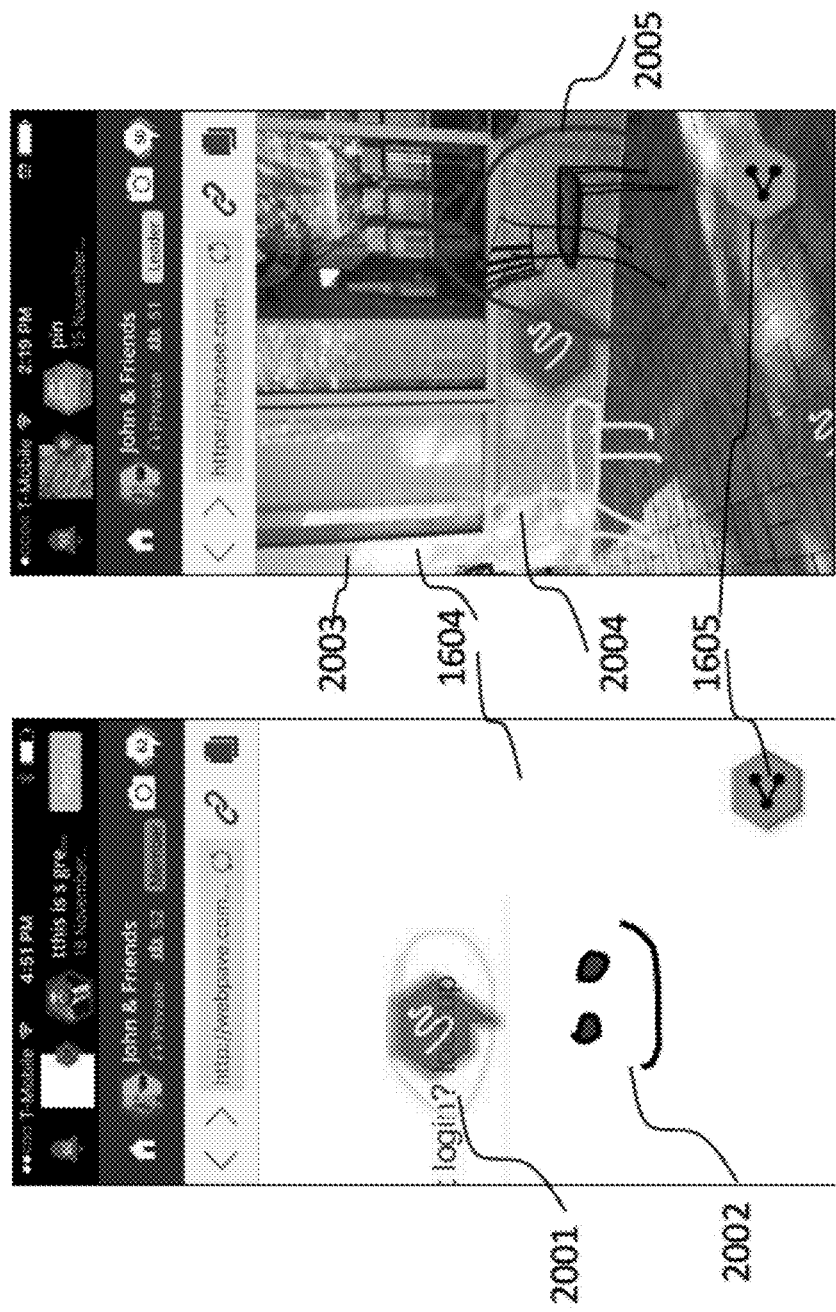
FIG. 20 illustrates single and plural user drawing annotations overlaid on both web pages and a user-generated photo image according to an embodiment of the invention.

In a preferred embodiment illustrated at FIG. 20, activating the a sharing control element 1605 permits a user 501 to create a drawing 2001 as an overlay to an electronic information resource 1604. In the case where a plurality of users is interacting using the present invention those users can, in some embodiments providing they have access to the channel, separately and contemporaneously create drawings in the same channel as an overlay to a same electronic information resource as additionally exemplified as drawing from user A at 2001 and drawing from user B at 2902.

In a preferred embodiment also illustrated at FIG. 20. a current electronic information resource 1604 may also include user generated content such as photo images exemplified here at 2003 and with simultaneously drawn lines from a plurality of users 501 exemplified as drawing from user A at 2004 and drawing from user B at 2005.

Figure 21:
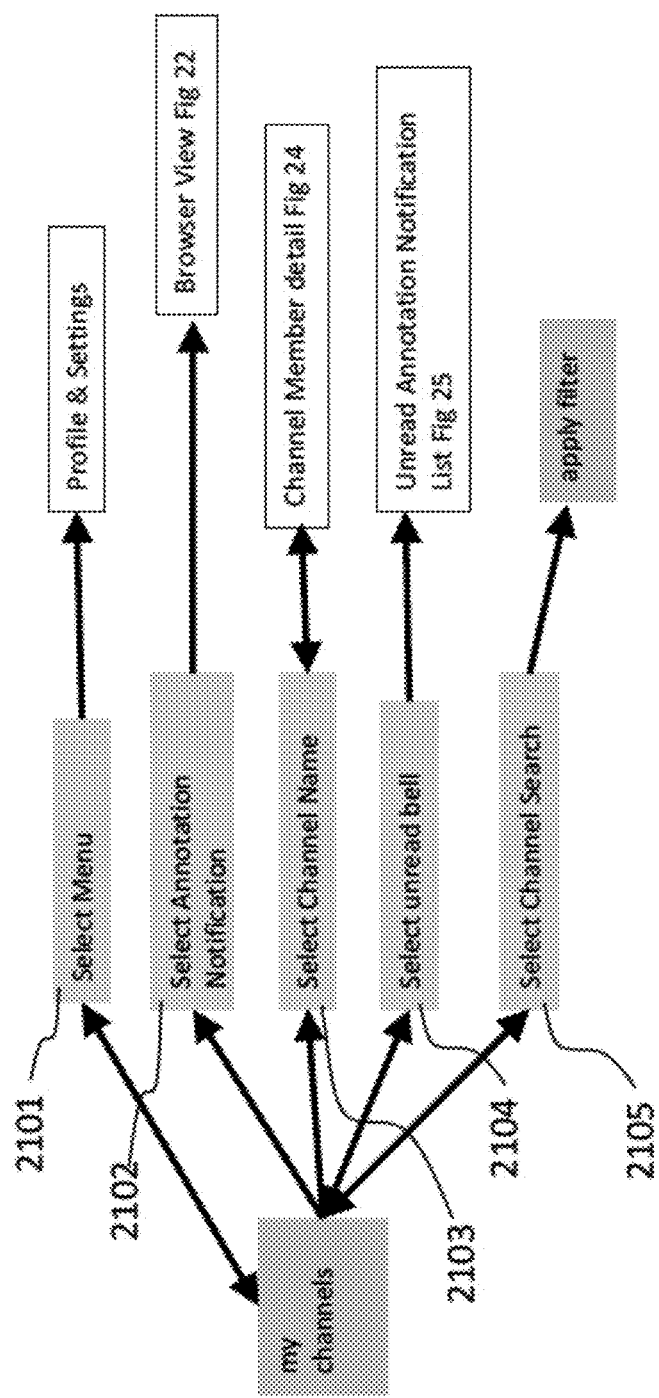
FIG. 21 illustrates a process flow method for user interactions with the channel user interface illustrated at FIG. 15.

In a preferred embodiment a user 501 interacts with a channel user interface displaying channels 1501 using a method illustrated in FIG. 21 which allows users 501 to select from the at least one channel using its thumbnail 1502. Referring to FIG. 21, a user may press a menu button in 2101 resulting in a user having access to a profile and settings menu or menus. There, the a user may edit their profile and settings by selecting from a submenu or entering information. Also referring to FIG. 21, a user may further select an annotation notification 2102, which allows a user to view and act on annotations by other users. FIG. 21 also illustrates that by selecting the a channel name 2013 a user is able to view channel detail information including which other users are members of the a channel. In FIG. 21, selecting an unread bell 2014 provides a user with a list of all annotation notifications that they have not yet read and a channel search function 2105 enables a user to select a set of channels fitting a set of search characteristics they enter. Subsequent processes may include those depicted in FIGS. 22 through 25.

Figure 22:
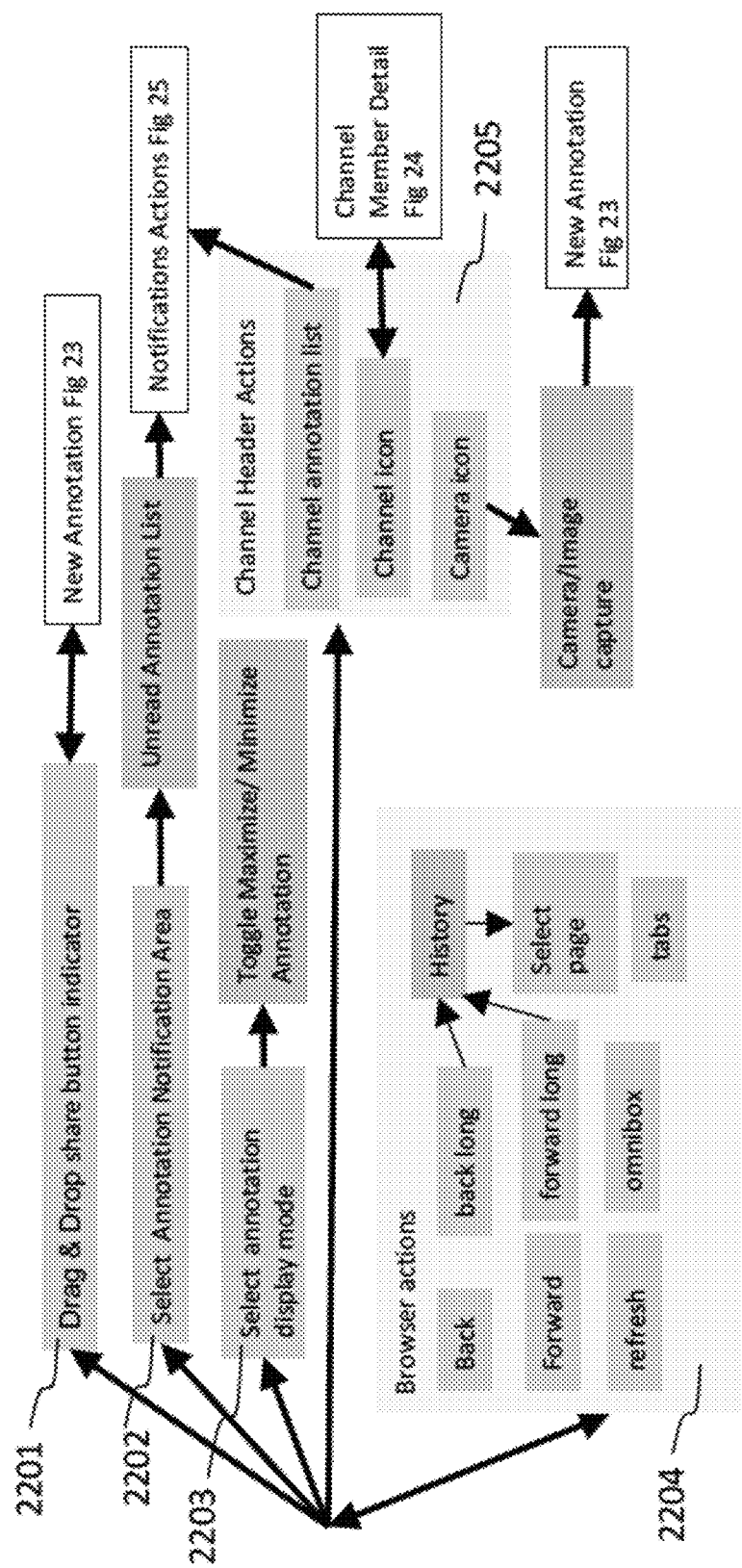
FIG. 22 illustrates a process flow method for user interactions associated with an Internet browser view and overlaying annotations.

In a preferred embodiment electronic information resources 1604 are displayed in an Internet browser view integrated with overlaid annotations e.g. 1901, 1902 and 1903 and any annotation notifications using the method illustrated at FIG. 22. The approach illustrated allows each user 501 to browse any electronic information resource 1604 independently of the activities of any other user 501 in the a current channel 1501 or any other channel 1501.

In a preferred embodiment also as illustrated in FIG. 22, annotations e.g. 1901, 1902 and 1903 are initiated by users 501 using a share button 1605 indicator which is dragged and dropped to a display location within a current electronic information resource 1604 viewing method as indicated in a drag and drop operation at 2201. In FIG. 22 are also shown methods that are added to standard browser operations 2204 which include accessing annotation notifications 2202 through annotation notification elements 1607 and the ability to modify how overlaid annotations e.g. 1901, 1902 and 1903 are displayed using selector 2203. FIG. 22 also illustrates a method of accessing information relevant to a channel 1501 through a channel header 1601 by selecting action elements 2205.

Figure 23:
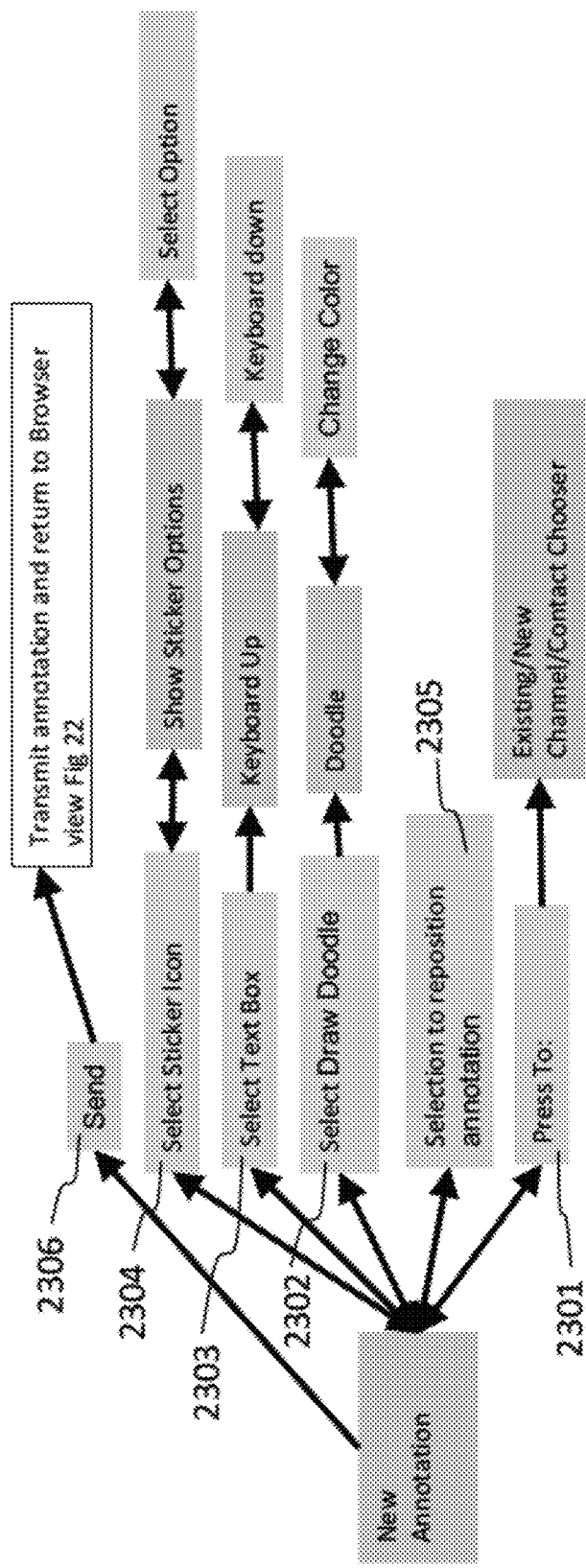
FIG. 23 illustrates a process flow method for user interactions associated with creating a new overlaid annotation and/or channel for overlaid annotations.

In a preferred embodiment a user 501, which includes a joining user, can initiate new overlaid annotations using the method illustrated at FIG. 23 which also permits an overlaid annotation to be used to start new channels 1501. FIG. 23 illustrates a method that can be used following selection of the a drag and drop operation 2201 such that a user may choose one or more options such as sending an overlaid annotation to a different or new channel 2301, select an annotation type such as a doodle 2302, sticker 2303 or text 2304, repositioning a draft overlaid annotation 2305 to a different viewing position and communicating a finalized annotation 2306 through a chosen channel 1501. An annotation e.g. 1901, 1902 and 1903 information is communicated to other users through a communications network to which users are connected as illustrated in FIG. 5 and FIG. 6. Annotations may be stored by all users 501 or stored for reference on one or more servers 501.

Figure 24:
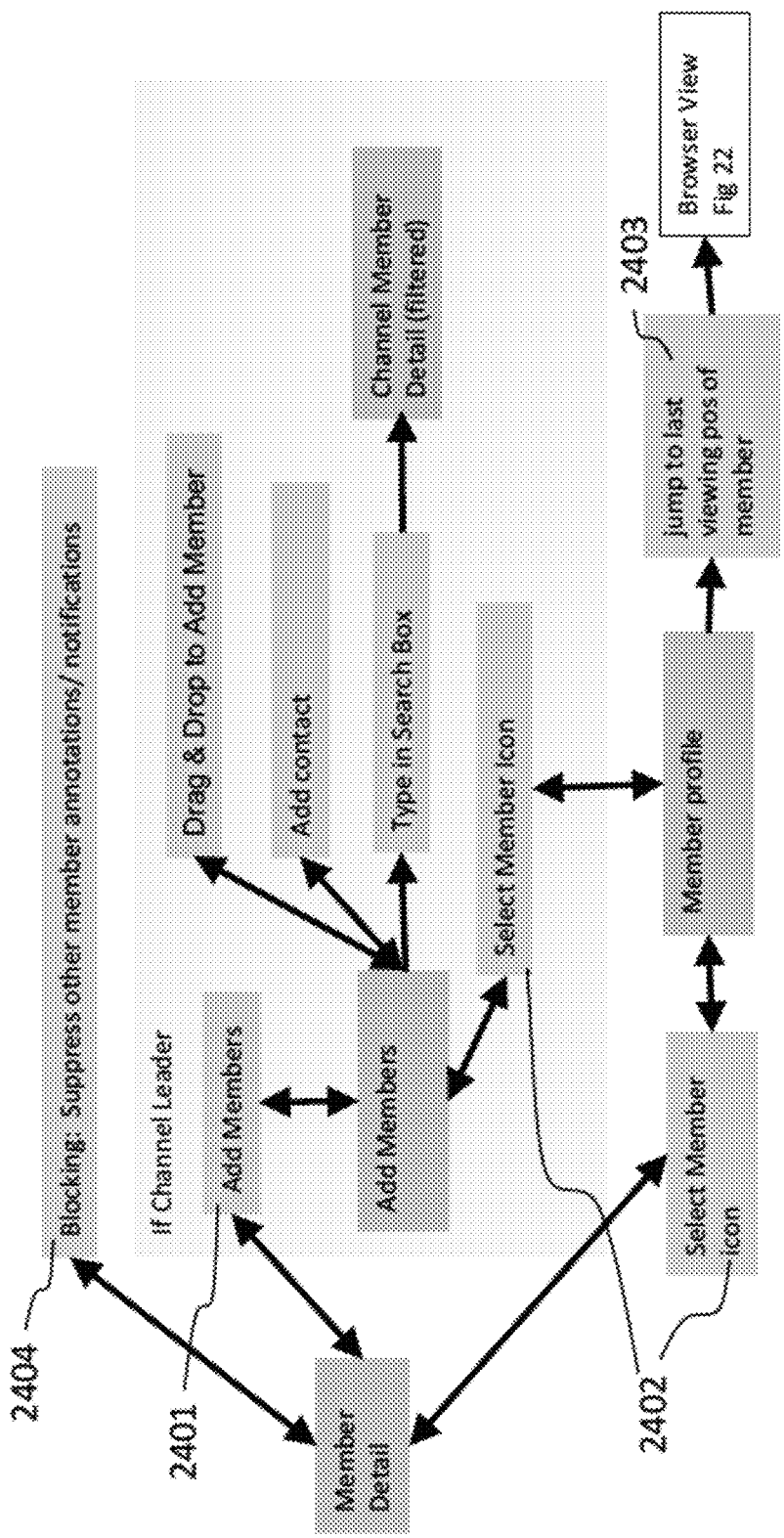
FIG. 24 illustrates a process flow method for user interactions associated with managing interactions with other users.

In a preferred embodiment, a user 501 can manage their interactions with other users including which other users 501 have access to channels 1501 they created or are leading through either a main menu, a channel thumbnail 1502 or a channel header 1601 through a member detail process as illustrated at FIG. 24. FIG. 24 shows a method in which members may be added or modified 2401 whether in a user's contact list or not, in which the a current user may select a specific member 2402 to see more detail and optionally jump to that member's viewing position 2403. FIG. 24 also illustrates the ability to block or suppress 2404 overlay annotations and associated annotation notifications.

Figure 25:
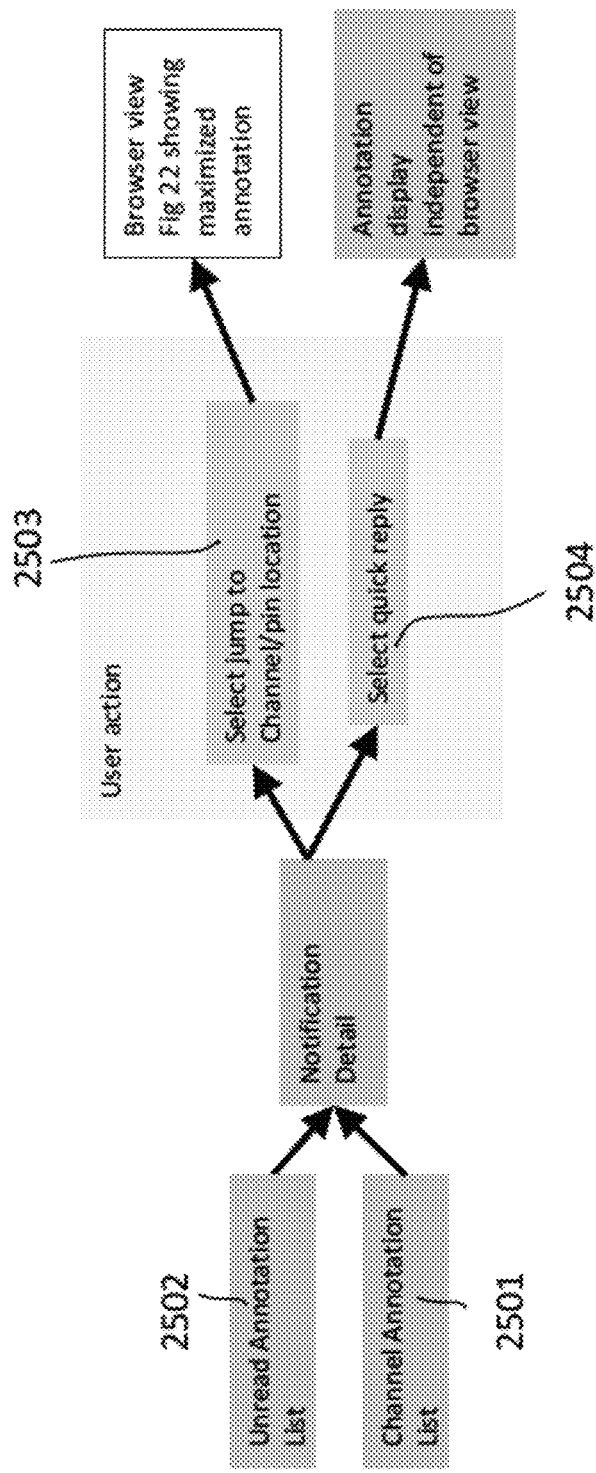
FIG. 25 illustrates a process flow method for user interactions associated with responding to annotations made by other users.

In a preferred embodiment users 501 that are members of a channel 1501 may receive notifications of annotations in channels 1501 they are members of and can view and respond to those annotations using the method illustrated in FIG. 25. As illustrated in FIG. 25, a user may access annotation notifications in the form of a channel list 2501 or an unread notification list 2502 and select to jump 2503 to the a browser view of that annotation e.g. 1901, 1902 and 1903 or to make a quick reply 2504 directly from an annotation notification area concerned.

According to some embodiments of the invention, a computer of mobile device includes a display, a processor, memory and input/output devices, such as a touch screen, buttons, keys, microphone, and speakers and a network interface for coupling the computer electrically, wirelessly or optically to at least one network, such as Wi-Fi network, a LAN, WAN or the Internet. The processor is coupled to the display, memory, input/output devices and the Internet and executes program instructions stored in the memory to perform various functions described herein.

According to some embodiments, the display includes a plurality of channels and other information as shown in FIGS. 15-20. The memory may store an application or app which allows users to login or logout, which information may be stored on a remote server. Channels shown on the display may be created when one or more users use the application to access content, for example on the Internet or another network, and the number of users in the channel can grow as users invite other users of the app or other users join a channel, who are permitted to do so by the app or by friendship status among one or more users. Data associated with a user's browsing within the app and/or channel within the app is stored to facilitate the collection and sharing of user activities described herein.

According to one embodiment, a user may sign in, view channels he or she is permitted to join, join channels, receive notifications of the activities of other users, and select notifications and be transported to electronic resources that are annotated by other users in the channel based on various user activities as described herein. Users may also access content while affiliated with one or more channels and perform activities that are pushed out to other users associated with or within at least one channel in the form of notifications or stored data on the user's browsing activity and annotations. The app itself may also provide statistics relating to the channels, update icons corresponding to channels based on user activity and provide other information to facilitate enabling users to engage and annotate content and perform activities around content in a channel.

While particular embodiments are disclosed herein, it will be understood by one having ordinary skill in the art that changes may be made to those embodiments without departing from the spirit and scope of the invention.

What is claimed is:

1. A method of storing, processing and sharing user activity information among one or more users, comprising:
    creating, using a processor, at least one channel indicator comprising at least one channel identifier, a user identifier for an originating channel user, at least one annotation input by said originating channel user, and viewing position parameters within a retrieved electronic information resource for the at least one annotation;
    sharing, using a processor and a network, the at least one channel indicator to at least one receiving channel user;
    detecting and monitoring for said receiving channel user in real time a) updates to the at last one channel indicator b) updates to the retrieved electronic information resource identified in the channel indicator and c) updates to the at least one channel user's current real-time viewing position parameters within a currently viewed retrieved electronic information resource;
    calculating and recalculating for said receiving channel user in real time a display location for the at least one annotation using a) the latest updates to the at last one channel indicator b) the latest updates to the retrieved electronic information resource identified in the channel indicator and c) the latest updates to the at least one channel user's current real-time viewing position parameters for the receiving user's currently viewed retrieved electronic information resource;
    displaying and redisplaying for said receiving channel user the at least one annotation at said calculated and recalculated display location in an overlay not aggregated with said retrieved electronic information resource for the at least one annotation, without altering said retrieved electronic information resource and without freezing said retrieved electronic information resource.

2. The method according to claim 1, wherein the annotations are an image.

3. The method according to claim 1, wherein the annotations are a user generated drawing.

4. The method according to claim 1, wherein the facilitating access includes pushing notifications to channel users of annotations made in the channel.

5. The method according to claim 1, wherein the displaying is done on a mobile device coupled to the Internet.

6. The method according to claim 1, wherein the mobile device includes a touchscreen and the channel indicator and the sharing indicator are icons.

7. The method according to claim 6, wherein the mobile device runs an application to facilitate the method for the joining user and the application also allows the joining user to: explore electronic information resources on the Internet within a selected channel and making annotations overlaid on said electronic information resources.

8. An apparatus for implementing a method of storing and sharing user activity information associated with a channel displaying one or more annotations overlaid on at least one electronic information resource, comprising:
    a display;
    an input/output hardware unit to access data over a network such that retrieved information is displayed by a retrieval and display software application;
    a program memory storing program instructions; and
    a processor, coupled to said program memory, the display and the input/output hardware unit, to execute program instructions for:
        creating, using a processor, at least one channel indicator comprising at least one channel identifier, a user identifier for an originating channel user, at least one annotation input by said originating channel user, and viewing position parameters within a retrieved electronic information resource for the at least one annotation;
        sharing, using a processor and a network, the at least one channel indicator to at least one receiving channel user;
        detecting and monitoring for said receiving channel user in real time a) updates to the at last one channel indicator b) updates to the retrieved electronic information resource identified in the channel indicator and c) updates to the at least one channel user's current real-time viewing position parameters within a currently viewed retrieved electronic information resource;
        calculating and recalculating for said receiving channel user in real time a display location for the at least one annotation using a) the latest updates to the at last one channel indicator b) the latest updates to the retrieved electronic information resource identified in the channel indicator and c) the latest updates to the at least one channel user's current real-time viewing position parameters for the receiving user's currently viewed retrieved electronic information resource;

displaying and redisplaying for said receiving channel user the at least one annotation at said calculated and recalculated display location in an overlay not aggregated with said retrieved electronic information resource for the at least one annotation, without altering said retrieved electronic information resource and without freezing said retrieved electronic information resource.

9. A system for implementing a method of storing and sharing user activity information associated with a channel by processing annotations overlaid on current and historic retrieved electronic information resources, comprising:

a database;

an input/output hardware unit to exchange data with a network;

a program memory for storing program instructions;

a processor coupled with a database, the input/output hardware unit and the memory to executing the program instructions for creating, using a processor, at least one channel indicator comprising at least one channel identifier, a user identifier for an originating channel user, at least one annotation input by said originating channel user, and viewing position parameters within a retrieved electronic information resource for the at least one annotation;

sharing, using a processor and a network, the at least one channel indicator to at least one receiving channel user;

detecting and monitoring for said receiving channel user in real time a) updates to the at last one channel indicator b) updates to the retrieved electronic information resource identified in the channel indicator and c) updates to the at least one channel user's current real-time viewing position parameters within a currently viewed retrieved electronic information resource;

calculating and recalculating for said receiving channel user in real time a display location for the at least one annotation using a) the latest updates to the at last one channel indicator b) the latest updates to the retrieved electronic information resource identified in the channel indicator and c) the latest updates to the at least one channel user's current real-time viewing position parameters for the receiving user's currently viewed retrieved electronic information resource;

displaying and redisplaying for said receiving channel user the at least one annotation at said calculated and recalculated display location in an overlay not aggregated with said retrieved electronic information resource for the at least one annotation, without altering said retrieved electronic information resource and without freezing said retrieved electronic information resource.

10. A computer program product for implementing a method of storing and sharing user activity information associated with a channel by displaying annotations overlaid on retrieved electronic information resources, including computer program logic stored in a non-transitory computer-readable storage medium, wherein the computer program logic comprises:

determining logic for causing a computer to access at least one channel indicator comprising at least one channel identifier, at least one channel identifier, a user identifier for an originating channel user, at least one annotation input by said originating channel user, and viewing position parameters within a retrieved electronic information resource for the at least one annotation;

sharing, using a processor and a network, the at least one channel indicator to at least one receiving channel user;

detecting and monitoring for said receiving channel user in real time a) updates to the at last one channel indicator b) updates to the retrieved electronic information resource identified in the channel indicator and c) updates to the at least one channel user's current real-time viewing position parameters within a currently viewed retrieved electronic information resource;

calculating and recalculating for said receiving channel user in real time a display location for the at least one annotation using a) the latest updates to the at last one channel indicator b) the latest updates to the retrieved electronic information resource identified in the channel indicator and c) the latest updates to the at least one channel user's current real-time viewing position parameters for the receiving user's currently viewed retrieved electronic information resource;

displaying and redisplaying for said receiving channel user the at least one annotation at said calculated and recalculated display location in an overlay not aggregated with said retrieved electronic information resource for the at least one annotation, without altering said retrieved electronic information resource and without freezing said retrieved electronic information resource.

11. A computer program product for implementing a method of storing and sharing channel indicator information associated with a channel by processing said channel indicator information overlaid on at least one electronic information resource at a first display location, including computer program logic stored in a non-transitory computer-readable storage medium, wherein the computer program logic comprises:

storage logic for causing a computer to receive and store in a database one or more sets of channel indicator information comprising at least one channel identifier, a user identifier for an originating channel user, at least one annotation input by said originating channel user, and viewing position parameters within a retrieved electronic information resource for the at least one annotation;

sharing, using a processor and a network, the at least one channel indicator to at least one receiving channel user;

detecting and monitoring for said receiving channel user in real time a) updates to the at last one channel indicator b) updates to the retrieved electronic information resource identified in the channel indicator and c) updates to the at least one channel user's current real-time viewing position parameters within a currently viewed retrieved electronic information resource;

calculating and recalculating for said receiving channel user in real time a display location for the at least one annotation using a) the latest updates to the at last one channel indicator b) the latest updates to the retrieved electronic information resource identified in the channel indicator and c) the latest updates to the at least one channel user's current real-time viewing position parameters for the receiving user's currently viewed retrieved electronic information resource;

displaying and redisplaying for said receiving channel user the at least one annotation at said calculated and recalculated display location in an overlay not aggregated with said retrieved electronic information resource for the at least one annotation, without altering said retrieved electronic information resource and without freezing said retrieved electronic information resource.

\* \* \* \* \*